United States Patent
Lerner

(10) Patent No.: US 12,528,486 B2
(45) Date of Patent: Jan. 20, 2026

(54) DETECTING AND RESPONDING TO THE DETECTION OF COMPROMISED VEHICLES

(71) Applicant: Woven by Toyota, Inc., Tokyo (JP)

(72) Inventor: Emily Lerner, Ypsilanti, MI (US)

(73) Assignee: WOVEN BY TOYOTA, INC., Tokyo (JP)

( * ) Notice: Subject to any disclaimer, the term of this patent is extended or adjusted under 35 U.S.C. 154(b) by 123 days.

(21) Appl. No.: 18/496,214

(22) Filed: Oct. 27, 2023

(65) Prior Publication Data
US 2025/0136131 A1      May 1, 2025

(51) Int. Cl.
*B60W 50/12*      (2012.01)

(52) U.S. Cl.
CPC ................... *B60W 50/12* (2013.01)

(58) Field of Classification Search
CPC .......... H04W 12/126; G08G 1/096708; G01C 21/3461; G01C 21/3605; B60W 50/12
See application file for complete search history.

(56) References Cited

U.S. PATENT DOCUMENTS

| | | | |
|---|---|---|---|
| 6,718,235 B1 * | 4/2004 | Borugian | G08G 1/207 701/1 |
| 10,573,184 B1 * | 2/2020 | Pandit | G08G 1/207 701/1 |
| 10,793,186 B2 * | 10/2020 | Bender | B62D 6/002 701/1 |
| 11,091,089 B2 | 8/2021 | Eigel | |
| 2018/0281784 A1 | 10/2018 | Huang | |
| 2022/0161760 A1 | 5/2022 | Moeller et al. | |

FOREIGN PATENT DOCUMENTS

| | | |
|---|---|---|
| DE | 102018210593 A1 | 8/2019 |
| JP | 2001216589 A | 8/2001 |
| JP | 3613115 B2 | 1/2005 |

* cited by examiner

*Primary Examiner* — Brodie J Follman
(74) *Attorney, Agent, or Firm* — DINSMORE & SHOHL LLP

(57) ABSTRACT

A method for detecting and responding to the detection of a compromised vehicle comprises: receiving one or more monitored inputs of a vehicle; predicting, using at least one of the monitored inputs, a predicted vehicle trajectory; detecting a detected vehicle trajectory; comparing the predicted vehicle trajectory to the detected vehicle trajectory; determining a trajectory deviation value of the predicted vehicle trajectory and the detected vehicle trajectory; in response to determining that the trajectory deviation value exceeds a pre-determined trajectory deviation threshold, generating a response action; and implementing the response action.

20 Claims, 11 Drawing Sheets

DETECTING AND RESPONDING TO THE DETECTION OF COMPROMISED VEHICLES

BACKGROUND

Field

The present disclosure generally relates to detecting compromised vehicles and responding to the detection of compromised vehicles, and more specifically, to methods, systems, and non-transitory computer-readable mediums for detecting compromised vehicles and implementing response actions to address compromised vehicles.

Technical Background

Modern vehicles are increasingly connected to wireless networks and reliant upon software and electronic components for operation of the vehicle. Further, vehicles increasingly incorporate automated-driving functionality and digitization of vehicle driving processes (e.g., acceleration of the vehicle being implemented by an electronic signal generated by pressing upon an accelerator pedal, rather than strictly manual processes causing the engine to accelerate). However, such connectivity and usage of software and electronic components introduce risks of vehicles becoming compromised (e.g., by hackers or malicious hardware or software), which may result in partial or complete control of systems of a vehicle being usurped by a malicious third party (e.g., "compromised). In such circumstances, driving of the compromised vehicle may be partially or wholly controlled by the third party (rather than by, e.g., a driver or an automated driving system of the vehicle). Further, the third party may conceal the compromised nature of a vehicle, such that a driver of a vehicle and/or vehicle security systems may not notice or detect the change of control of the systems of the vehicle.

Accordingly, a need exists for systems, methods, and non-transitory computer-readable mediums which analyze driver behavior and vehicle trajectory of a vehicle to detect whether the vehicle has been compromised and is being controlled by a third-party.

SUMMARY

According to a first aspect A1, a method for detecting and responding to the detection of a compromised vehicle may comprise: receiving, by a computing device, one or more monitored inputs of a vehicle; predicting, by the computing device and using at least one of the monitored inputs, a predicted vehicle trajectory: detecting, by a vehicle sensing system, a detected vehicle trajectory: comparing, by the computing device, the predicted vehicle trajectory to the detected vehicle trajectory; determining, by the computing device, a trajectory deviation value of the predicted vehicle trajectory and the detected vehicle trajectory: in response to determining, by the computing device, that the trajectory deviation value exceeds a trajectory deviation threshold, generating a response action; and implementing, using the computing device, the vehicle, or both, the response action.

A second aspect A2 includes the method according to the first aspect A1, wherein the vehicle may comprise a car.

A third aspect A3 includes the method according to the first aspect A1 or the second aspect A2, wherein the one or more monitored inputs may be received from the vehicle sensing system, a driver of the vehicle, a remote computing device, an automated driving system of the vehicle, or a combination thereof.

A fourth aspect A4 includes the method according to any of the aspects A1-A3, wherein the one or more monitored inputs may comprise at least one of a pedal throttle pattern input, a braking pattern input, a linear acceleration input, a lateral acceleration input, a turn smoothness input, a turn radius input, an operation mode input, an engine mode input, a gear mode input, a user-interfacing vehicle system input, or a combination thereof.

A fifth aspect A5 includes the method according to the any of the aspects A1-A4, wherein the method may further comprise at least any of the following: comparing, by the computing device, at least one of the monitored inputs, the detected vehicle trajectory, or both to a driver profile: determining, by the computing device, a driver profile deviation value of the driver profile and the detected vehicle trajectory, at least one of the monitored inputs, or both; and in response to determining, by the computing device, that the driver profile deviation value exceeds a profile deviation threshold, generating the response action.

A sixth aspect A6 includes the method according to the aspect A5, wherein the driver profile may be generated from historical inputs of a driver of the vehicle, an automated driving system of the vehicle, or a combination thereof.

A seventh aspect A7 includes the method according to any of the aspects A1-A6, wherein the response action may comprise at least one of a security sweep, a shut-off of connectivity, an alert to a driver of the vehicle, an alert to a third party, a shut-off of the vehicle, a shut-off of a component of the vehicle, a shut-off of a system of the vehicle, an override instruction, an instruction check, or a combination thereof.

According to an eighth aspect B1, a system for detecting and responding to the detection of a comprised vehicle may comprise a vehicle sensing system of a vehicle and a computing device comprising a memory component, wherein the memory component stores logic that, when executed by the computing device, causes the system to perform at least the following: receive one or more monitored inputs of the vehicle: predict, using at least one of the monitored inputs, a predicted vehicle trajectory; detect, by the vehicle sensing system, a detected vehicle trajectory; compare the predicted vehicle trajectory to the detected vehicle trajectory: determine a trajectory deviation value of the predicted vehicle trajectory and the detected vehicle trajectory: in response to determining that the trajectory deviation value exceeding a trajectory deviation threshold, generating a response action; and implement, using the computing device, the vehicle, or both, the vehicle, or both, the response action.

A ninth aspect B2 includes the system according to the eighth aspect B1, wherein the vehicle may comprise a car.

A tenth aspect B3 includes the system according to the eighth aspect B1 or the ninth aspect B2, wherein the one or more monitored inputs may be received from the vehicle sensing system, a driver of the vehicle, a remote computing device, an automated driving system of the vehicle, or a combination thereof.

An eleventh aspect B4 includes the system according to any of the aspects B1-B3, wherein the one or more monitored inputs may comprise at least one of a pedal throttle pattern input, a braking pattern input, a linear acceleration input, a lateral acceleration input, a turn smoothness input, a turn radius input, an operation mode input, an engine mode input, a gear mode input, a user-interfacing vehicle system input, or a combination thereof.

A twelfth aspect B5 includes the system according to any of the aspects B1-B4, wherein the system may further perform at least any of the following: comparing the detected vehicle trajectory, at least one of the monitored inputs, or both to a driver profile; determine a driver profile deviation value of the driver profile and the detected vehicle trajectory, at least one of the monitored inputs, or both; and generate, upon the driver profile deviation value exceeding a profile deviation threshold, the response action.

A thirteenth aspect B6 includes the system according to the aspect B5, wherein the driver profile may be generated from historical inputs of a driver of the vehicle, an automated driving system of the vehicle, or a combination thereof.

A fourteenth aspect B7 includes the system according to any of the aspects B1-B6, wherein the response action may comprise at least one of a security sweep, a shut-off of connectivity, an alert to a driver of the vehicle, an alert to a third party, a shut-off of the vehicle, a shut-off of a component of the vehicle, a shut-off of a system of the vehicle, an override instruction, an instruction check, or a combination thereof.

According to a fifteenth aspect C1, a non-transitory computer-readable medium for detecting and responding to the detection of a comprised vehicle may store logic that, when executed by a computing device, causes the computing device to perform at least any of the following: receive one or more monitored inputs of a vehicle: predict, using at least one of the monitored inputs, a predicted vehicle trajectory: detect, by a vehicle sensing system, a detected vehicle trajectory: compare the predicted vehicle trajectory to the detected vehicle trajectory; determine a trajectory deviation value of the predicted vehicle trajectory and the detected vehicle trajectory; in response to determining that the trajectory deviation value exceeds a trajectory deviation threshold, generating a response action; and implementing, using the computing device, the vehicle, or both, the response action.

A sixteenth aspect C2 includes the non-transitory computer-readable medium of the fifteenth aspect C1, wherein the one or more monitored inputs may be received from the vehicle sensing system, a driver of the vehicle, a remote computing device, an automated driving system of the vehicle, or a combination thereof.

A seventeenth aspect C3 includes the non-transitory computer-readable medium of the fifteenth aspect C1 or the sixteenth aspect C2, wherein the one or more monitored inputs may comprise at least one of a pedal throttle pattern input, a braking pattern input, a linear acceleration input, a lateral acceleration input, a turn smoothness input, a turn radius input, an operation mode input, an engine mode input, a gear mode input, a user-interfacing vehicle system input, or a combination thereof.

An eighteenth aspect C4 includes the non-transitory computer-readable medium of any of the aspects C1-C3, wherein the system may further perform at least any of at least the following: comparing the detected vehicle trajectory, at least one of the monitored inputs, or both to a driver profile: determine a driver profile deviation value of the driver profile and the detected vehicle trajectory, at least one of the monitored inputs, or both; and in response to determining that the driver profile deviation value exceeds a profile deviation threshold, generating the response action.

A nineteenth aspect C5 includes the non-transitory computer-readable medium of the eighteenth aspect C4, wherein the driver profile may be generated from historical inputs of a driver of the vehicle, an automated driving system of the vehicle, or a combination thereof.

A twentieth aspect C6 includes the non-transitory computer-readable medium of any of the aspects C1-C5, wherein the response action may comprise at least one of a security sweep of the vehicle, a shut-off of connectivity of the vehicle, an alert to a driver of the vehicle, an alert to a third party, a shut-off of the vehicle, a shut-off of a component of the vehicle, a shut-off of a system of the vehicle, an override instruction, an instruction check, or a combination thereof.

A twenty-first aspect C7 includes the non-transitory computer-readable medium of any of the aspects C1-C6, wherein the vehicle may be a car.

Additional features and advantages of the aspects described herein will be set forth in the detailed description which follows, and in part will be readily apparent to those skilled in the art from that description or recognized by practicing the aspects described herein, including the detailed description, which follows, the claims, as well as the appended drawings.

It is to be understood that both the foregoing general description and the following detailed description describe various aspects and are intended to provide an overview or framework for understanding the nature and character of the claimed subject matter. The accompanying drawings are included to provide a further understanding of the various aspects, and are incorporated into and constitute a part of this specification. The drawings illustrate the various aspects described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
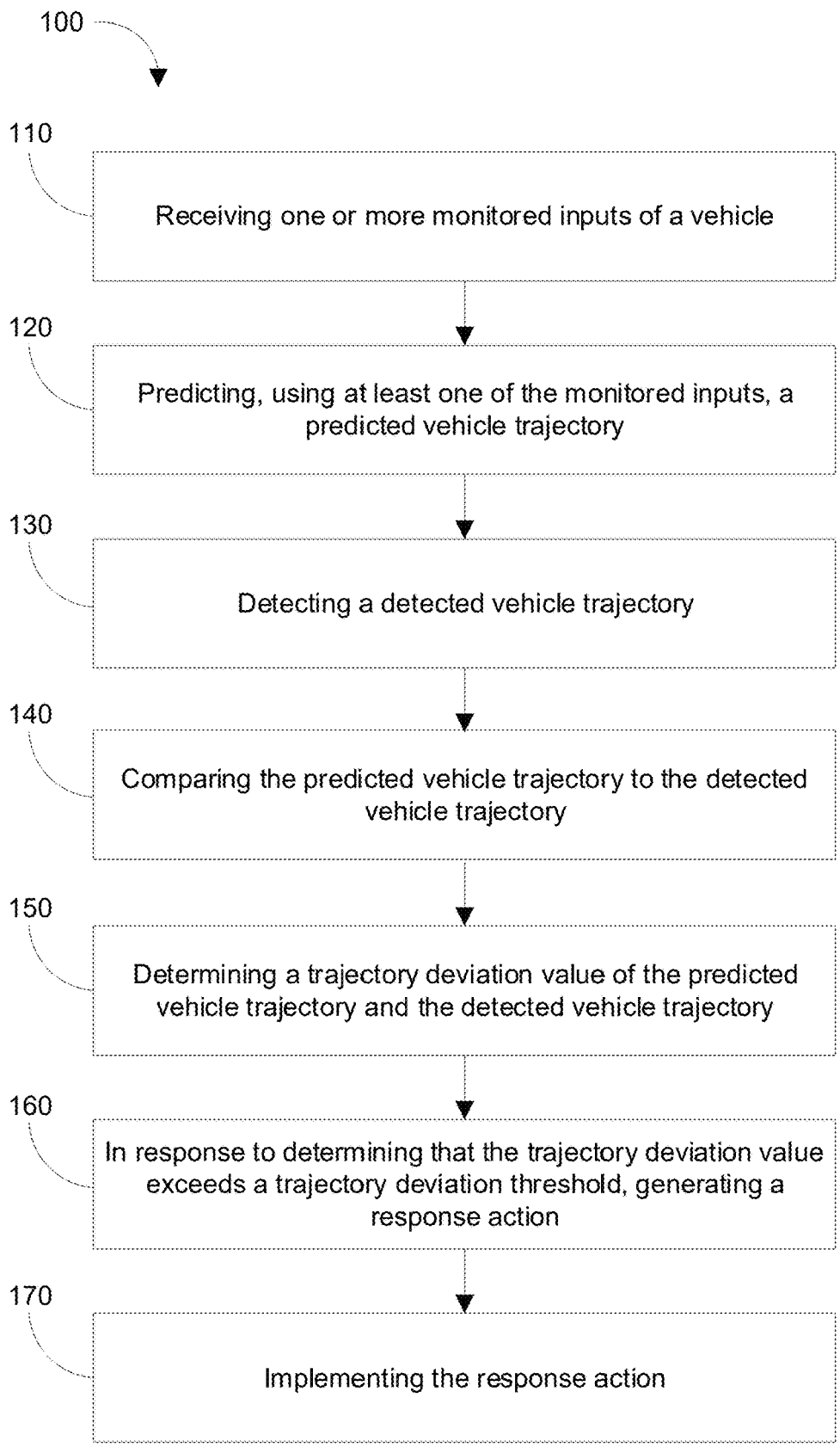
FIG. 1 is a flow diagram of a first method for responding to the detection of a compromised vehicle, according to one or more embodiments shown and described herein.

Due to, e.g., connectivity of vehicles to wireless networks, reliance of vehicles upon software and electronic components, and incorporation, in vehicle systems, of automated driving systems, a vehicle (and/or systems and/or components thereof) may become compromised, due to, e.g., malicious third parties or software. When a vehicle is compromised, the vehicle may nonetheless operate normally or appear to operate normally, even if an intervening malicious third party or software has control over the vehicle (and/or systems and/or components thereof). While vehicles may be equipped with security systems to prevent the compromising of the vehicle, the security system may nonetheless have weaknesses enabling malicious third parties or software to compromise the vehicle (and/or systems and/or components thereof), and so mechanisms for determining, observationally, whether a vehicle has been compromised and for generating response actions accordingly may nonetheless provide a safety mechanism against the risk of a vehicle becoming compromised.

It should be understood that "components" of a vehicle, as described herein, are physical devices, sensors, apparatuses, and/or any other functional parts of a vehicle. For example, in embodiments, components of a vehicle may include a vehicle's accelerator pedal, brake pedal, brakes, engine, steering wheel, wheel(s), air conditioning and/or heating units, windshield wipers, internal and/or external lights, manual controls for other components (e.g., knobs, buttons, and/or sticks), a vehicle user display, and/or any other functional physical parts of a vehicle.

It should be understood that "systems" of a vehicle, as described herein, are digital infrastructures, physical infrastructures, and/or combinations thereof which provide one or more functions to the vehicle 200. For example, in embodiments, systems of a vehicle may include a vehicle security system, a vehicle automated driving system, a digital user interface, vehicle software infrastructure(s), and/or combinations of components which serve a designated function (e.g., an air conditioning system including manual controls or an interface, an air conditioning unit, and/or other software and/or hardware which provides air conditioning functionality).

It should be understood that the term "compromised vehicle" as used herein refers to a vehicle being partially or wholly controlled by a third party (e.g., a hacker), rather than by, e.g., a driver of the vehicle or an automated driving system of the vehicle. That is, a vehicle that is partially or wholly controlled by a third-party without the desire or intent of any, some, or all of a driver of the vehicle and/or an automated driving system of the vehicle.

When a vehicle is compromised, the compromised nature of the vehicle may not become immediately apparent to a driver or security system of a vehicle. For example, a malicious third party or software may nonetheless permit the vehicle to function normally or replicate normal function of the vehicle (e.g., by replicating electrical signals produced by components of the vehicle, such as signals generated by an accelerator pedal when depressed by a driver) to provide the illusion that the vehicle is not compromised. Further, with the development and increasing usage of automated driving systems, the compromised nature of a vehicle may further be obscured from a driver, as it may not be obvious to a driver that a malicious third party or software, rather than an automated driving system of the vehicle, is controlling operation of the vehicle.

It should be understood that the term "automated driving system" as used herein refers to software, hardware, or any combination thereof which enables a vehicle to drive without the total or partial control of a human driver. That is, an automated driving system is a collection of software, hardware, or any combination thereof which enables partial or complete control of driving of a vehicle to be managed by the system, rather than by the driver, to, e.g., assist the driver's driving of the vehicle or completely or partially become responsible for the driving of the vehicle.

Accordingly, embodiments described herein may provide methods, systems, and non-transitory computer-readable mediums which enable the identification of the compromised nature of a vehicle, even if a security system of the vehicle has failed to prevent the vehicle from becoming comprised and/or identify that the vehicle is compromised.

Reference will now be made in detail to various embodiments of methods, systems, and non-transitory computer-readable mediums for detecting and responding to the detection of a compromised vehicle, in particular for detecting compromised vehicles by monitoring inputs and/or detected trajectories of the compromised vehicles and implementing response actions to address the compromised vehicles. Specifically, in embodiments, the methods described herein include receiving one or more monitored inputs of a vehicle; predicting, using at least one of the monitored inputs, a predicted vehicle trajectory; detecting a detected vehicle trajectory; comparing the predicted vehicle trajectory to the detected vehicle trajectory; determining a trajectory deviation value of the predicted vehicle trajectory and the detected vehicle trajectory: in response to determining that the trajectory deviation value exceeds a trajectory-deviation threshold, generating a response action; and implementing the response action.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and: the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Figure 2:
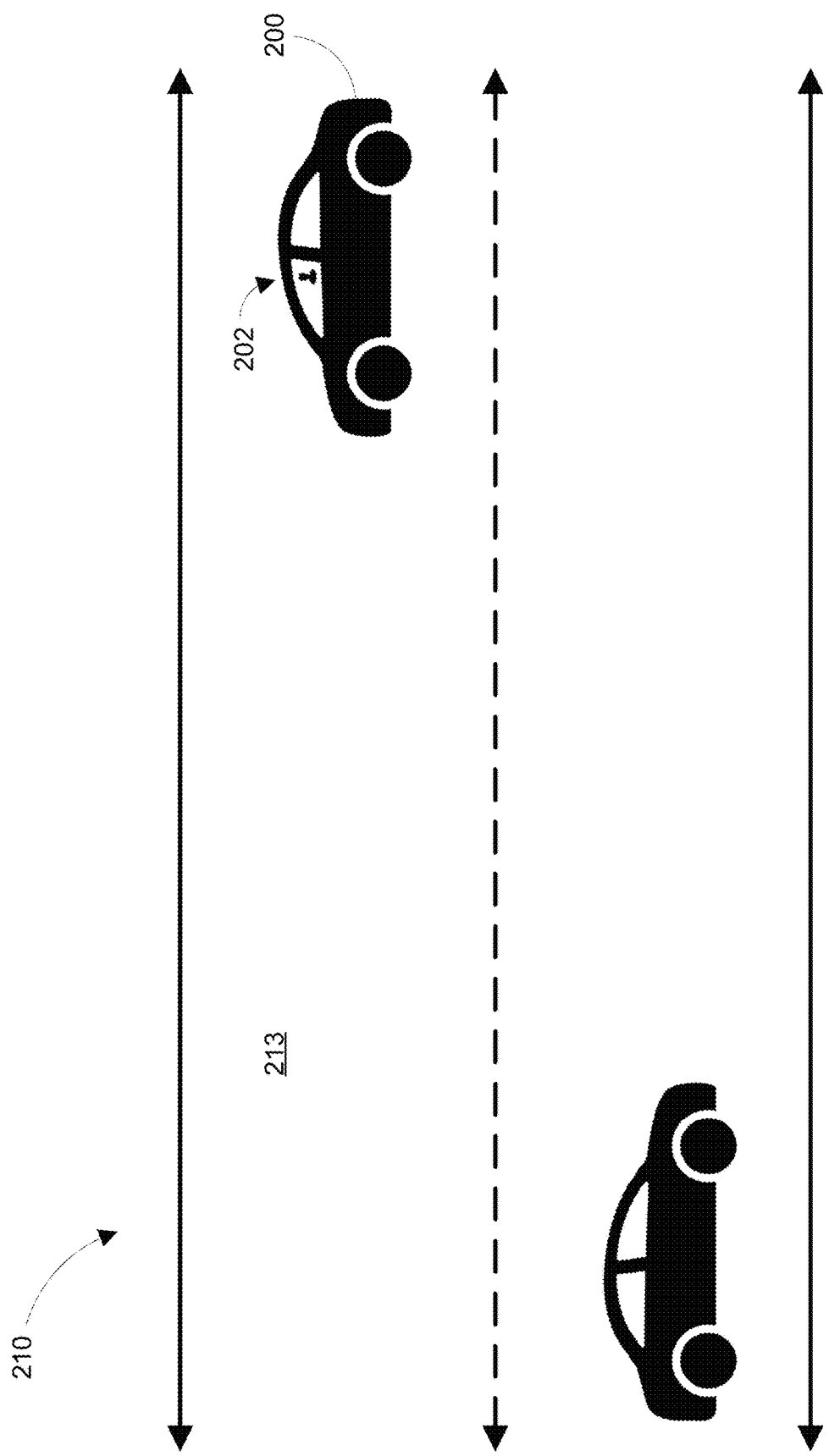
FIG. 2 depicts a vehicle traversing a road, according to one or more embodiments shown and described herein.

Referring now to FIGS. 1-2, a method 100 for responding to the detection of a compromised vehicle includes a block 110 of receiving one or more monitored inputs of a vehicle 200. In the embodiment of FIG. 2, the vehicle 200 is driving in a lane 213 of a road 210. In the embodiment of FIG. 2, the vehicle 200 is driven by a driver 202, but, in other embodiments, the vehicle 200 may be driven by an automated driving system (e.g., an automated driving system 330G of the vehicle 200, as described in further detail below with reference to FIG. 6) of the vehicle 200. In embodiments, the one or more monitored inputs of the vehicle 200 may include inputs from the driver 202, an automated driving system of the vehicle 200 (e.g., an automated driving system 330G of the vehicle 200, as described in further detail below with reference to FIG. 6), a vehicle computing device of the vehicle 200 (e.g., a vehicle computing device 310, as described in further detail below with reference to FIG. 3A), a remote computing device (e.g., a remote computing device 350, as described in further detail below with reference to FIG. 3B), and/or any combination thereof. In embodiments, the one or more monitored inputs of the vehicle 200 may include inputs from any system and/or component of the vehicle 200 which control or otherwise affect the driving of the vehicle 200 or operation of components or systems of the vehicle 200. In embodiments, the vehicle 200 may be a car. In other embodiments, the vehicle 200 may instead be, e.g., a truck, machinery, a boat or other water-faring vessel, a plane, a helicopter, and/or any other type of vehicle.

In embodiments, any, some, or all of the at least one monitored inputs may include a single input (e.g., a change of a gear mode of the vehicle 200) or a plurality of inputs (e.g., several instances of braking by the driver 202 in a braking pattern) by a user of the vehicle 200 (e.g., the driver 202 and/or an automated driving system of the vehicle 200) instructing a change related to or otherwise affecting and/or determining a quality, operation, and/or other aspect of a system, component, and/or function of the vehicle 200. In embodiments, monitored inputs may include data including instructions (e.g., from the driver 202 and/or an automated driving system of the vehicle 200) and/or observed behavior of the vehicle 200 relating to one or more of a pedal throttle pattern, a braking pattern, a linear acceleration, a lateral acceleration, a turn smoothness, a turn radius, an operation mode, an engine mode, a gear mode, a user-interfacing vehicle system, any other quality, operation, and/or other aspect of a system, component, and/or function of the vehicle 200, or a combination thereof. Accordingly, in embodiments, the one or more monitored inputs may comprise at least one of a pedal throttle pattern input, a braking pattern input, a linear acceleration input, a lateral acceleration input, a turn smoothness input, a turn radius input, an operation mode input, an engine mode input, a gear mode input, a user-interfacing vehicle system input, or a combination thereof.

In embodiments, a pedal throttle pattern may include a speed, extent, and/or frequency at which a pedal (e.g., a brake pedal, an acceleration pedal, or a gear-shift pedal) is depressed and/or released and/or other data pertaining to the usage of a pedal (e.g., by the driver 202 or an automated driving system of the vehicle 200) in a moment and/or over time. In embodiments, a braking pattern may be one or more of a frequency of braking, magnitude of braking, a speed, extent, and/or frequency at which a brake pedal of the vehicle 200 is depressed and/or released, and/or other data relating to braking (e.g., by the driver 202 or an automated driving system) of the vehicle 200 in a moment and/or over time. In embodiments, a linear acceleration may be one or more of a frequency of acceleration, a magnitude of acceleration, a rate at which an acceleration pedal of the vehicle 200 is depressed and/or released, and/or other data related to acceleration (e.g., by the driver 202 or an automated driving system) of the vehicle 200 in a moment and/or over time. In embodiments, a turn smoothness may be one or more of an extent of turning, a rate of turning (e.g., a change of velocity in a turn and a rate of the change of velocity, either of the vehicle or as measured by, e.g., a steering), operation of a steering wheel of the vehicle 200 (e.g., by the driver 202), and/or other data related to smoothness of turns (e.g., by the driver 202 or an automated driving system) of the vehicle 200 in a moment and/or over time. In embodiments, a turn radius may be a radius of a turn taken by the vehicle 200 (under the control of, e.g., the driver 202 or an automated driving system of the vehicle 200). In embodiments, an operation mode of the vehicle 200 may be a condition or modality of operation of the vehicle 200 (e.g., as requested and/or set by the driver 202 or an automated driving system of the vehicle 200) such as a charging mode (e.g., wherein an electronic vehicle is connected to a charger and receives energy from the charger), a "sports" mode (e.g., a mode increasing an acceleration amount for a given level of depression of an acceleration pedal), a "low" mode (e.g., wherein the vehicle is configured to function with (e.g., electrical) systems of a towed device or vehicle, or any other mode of operation of the vehicle 200. In embodiments, an engine mode may be a state of an engine of the vehicle 200, such as a "drive" mode wherein the vehicle 200 is configured to move forward, a "reverse" mode wherein the vehicle 200 is configured to move backward, a "park" mode wherein a parking brake of the vehicle 200 is engaged and the vehicle 200 is configured to not move and/or resist movement, a "neutral" mode in which engaging the engine does not move the vehicle 200, and/or any other modes of an engine of the vehicle 200. In embodiments, a gear mode may be a gear shift state of a manual or automatic transmission of the vehicle 200, such as first gear, second gear, and/or third gear. In embodiments, a user-interfacing vehicle system may include components and/or systems of the vehicle 200 which may be controlled by a user (e.g., the driver 202 or a passenger) of the vehicle 200 via a control mechanism (e g . . . a manual knob, button, and/or switch, a touch-screen digital interface, and/or voice and/or other non-touch controls), such as an air-conditioning system, a heating system, windshield wipers, a radio system, an audio system, windshield wipers and associated windshield wiper speeds and frequencies, and/or any other system, component, or aspect or quality thereof which may be controlled by the user of the vehicle.

Figure 3A:
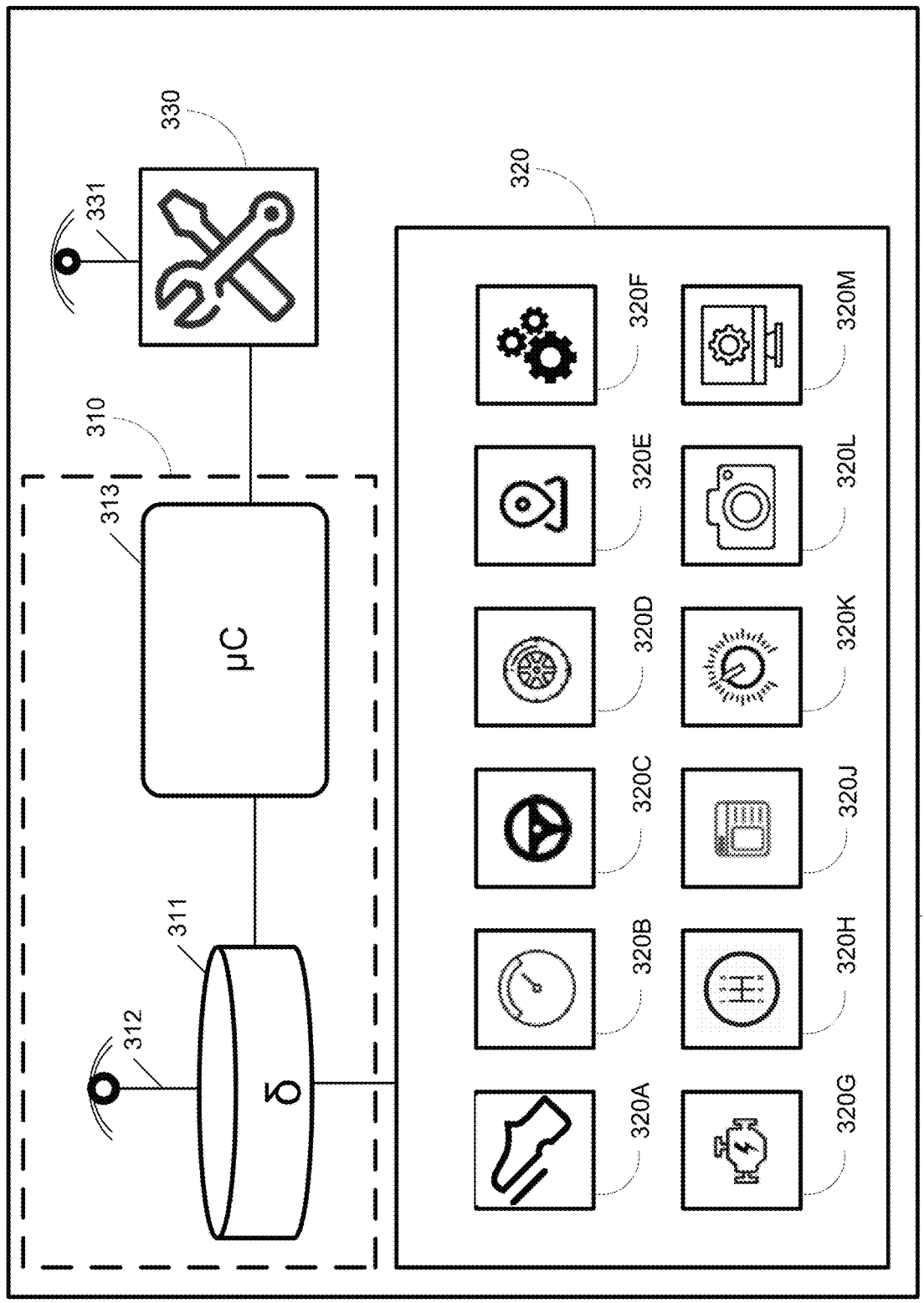
FIG. 3A schematically depicts hardware for detecting a compromised vehicle and for implementing response actions, according to one or more embodiments shown and described herein.

Referring to FIG. 3A, a system 300 for detecting and responding to the detection of a compromised vehicle may include, in embodiments, the vehicle 200, components and/or systems of the vehicle 200, and/or hardware (e.g., electrical components and/or manual controls) and/or software which control and/or operate the vehicle 200 or any components or systems thereof and/or perform any, some, or all of data or signal processing, data communication, and/or data or signal output of the vehicle. In embodiments, the system 300 may include or be coupled to a vehicle computing device 310, a vehicle sensing system 320, and a vehicle control system 330. In embodiments, the system 300 may provide or receive input data and generate and implement results of compromised vehicle detection and response action generation.

In embodiments, the vehicle computing device 310 may include or be coupled to a transceiver 312 (which may be configured as a transmitter, receiver and/or a transceiver) and/or the vehicle sensing system 320, from which the vehicle computing device 310 may receive the one or more monitored inputs of the vehicle 200. Depending on the embodiment, the remote computing device 350 may receive sensor data from dozens, hundreds, or even thousands of different pieces of hardware located throughout the vehicle 200 or otherwise sensing data regarding the driving or operation of the vehicle 200. In embodiments, the vehicle computing device 310 may include a vehicle data memory component 311 (denoted in FIG. 3A as 8) for storing data corresponding to the received (from, in embodiments, the vehicle sensing system 320 and/or via, in embodiments, the transceiver 312) monitored inputs of the vehicle 200. Depending on the particular embodiment, the vehicle data memory component 311 may be configured as random access memory (RAM), read only memory (ROM), registers, a database, and/or other hardware for storing the data corresponding to the received monitored inputs of the vehicle 200. As such, the vehicle data memory component 311 may be part of a broader memory component of the vehicle computing device 310, a data storage component, and/or part of other data storage infrastructure.

The vehicle computing device 310 may further include a vehicle input monitor 313 (denoted in FIG. 3A as µC), which, in embodiments, may represent software operations that are performed on the data corresponding to the monitored inputs of the vehicle 200 obtained from either or both of the transceiver 312 and/or the vehicle sensing system 320. The vehicle data memory 311 may store logic (such as a trajectory deviation logic for calculating a trajectory deviation value and/or a driver profile deviation logic for calculating a driver profile deviation value, as described in further detail below) which, when executed by the vehicle input monitor 313, may cause the system 300 to perform any, some, or all of receiving one or more monitored inputs of the vehicle 200, predicting a predicted vehicle trajectory (e.g., a predicted vehicle trajectory 220 as depicted in FIGS. 4-5D and described in further detail below), detecting a detected vehicle trajectory (e.g., any, some, or all of detected vehicle trajectories 222, 224, 226, 228 as depicted in FIGS. 5A-5D and described in further detail below), comparing a predicted vehicle trajectory to a detected vehicle trajectory (as described in further detail below with reference to FIGS. 1 and 5A-5D), determining a trajectory deviation value of a predicted vehicle trajectory and a detected vehicle trajectory (as described in further detail below with reference to FIGS. 1 and 5A-5D), generating a response action (as described in further detail below with reference to FIGS. 1 and 3A-3B), implementing a response action (as described in further detail below with reference to FIGS. 1 and 6), comparing a detected vehicle trajectory, monitored inputs, or both to a driver profile (as described in further detail below with reference to FIGS. 5A-5D and 7), and/or determining a driver profile deviation value of a driver profile and a detected vehicle trajectory, monitored inputs, or both (as described in further detail below with reference to FIGS. 3A-3B and 7).

In embodiments, the vehicle sensing system 320 is coupled to the vehicle computing device 310 and may include or be coupled to one or more vehicle sensors which detect information regarding the driving or operation of the vehicle 200. In embodiments, the vehicle sensing system 320 may include or be coupled to physical sensors which may detect manual (e.g., depression of a pedal or turning of a steering wheel of the vehicle 200 by the driver 202) instructions regarding the driving or operation of the vehicle 200 received from, e.g., the driver 202 or an automated driving system of the vehicle 200. In embodiments, the vehicle sensing system 320 may include or be coupled to digital sensors which may detect digital instructions (e.g., signals from an automated driving system of the vehicle 200 or from operation of electrical hardware of the vehicle 200, such as a pedal or steering wheel, by the driver 202) regarding the driving or operation of the vehicle 200 received from, e.g., the driver 202 or an automated driving system of the vehicle 200. In embodiments, the vehicle sensing system 320 may include sensors for detecting movement, a position, or a state of the vehicle 200 or components or systems of the vehicle 200.

Returning to FIG. 3A, the vehicle sensing system 320 may include a pedal sensor 320A, which may detect, e.g., a pedal throttle pattern (e.g., as the pedal is depressed by the driver 202) of a pedal, a linear acceleration input, a braking pattern, and/or electrical signals regarding the same of the vehicle 200. In embodiments, the pedal sensor 320A may include. e.g., a pressure sensor (for, e.g., detecting a depression of a pedal of the vehicle 200) a positional sensor (for, e.g., detecting a position of a pedal of the vehicle 200), and/or other sensors.

In embodiments, the vehicle sensing system 320 may include an acceleration sensor 320B which may detect, e.g., a speed, linear acceleration, lateral acceleration, and/or a braking pattern of the vehicle 200. In embodiments, the acceleration sensor 320B may include, e.g., a speedometer, an accelerometer, a global positioning unit (which may measure an acceleration, braking, and/or speed of the vehicle 200 via comparison of locational information of the vehicle 200), and/or other sensors.

In embodiments, the vehicle sensing system 320 may include a steering sensor 320C which may detect, e.g., a lateral acceleration input, a turn smoothness input, a lateral acceleration input, and/or electrical signals regarding the same of the vehicle 200 (including. e.g., a steering wheel of the vehicle 200). In embodiments, the steering sensor 320C may include, e.g., a gyroscope (e.g., for detecting an orientation of a steering wheel of the vehicle 200), a pressure sensor (e.g., for detecting a force turning a steering wheel of the vehicle 200), and/or other sensors.

In embodiments, the vehicle sensing system 320 may include a wheel sensor 320D which may detect, e.g., a speed (e.g., laterally or rotationally relative to an axle), an orientation (e.g., relative to a chassis of the vehicle 200), a braking pattern, a linear acceleration, and/or a lateral acceleration of one or more wheels of the vehicle 200. In embodiments, the wheel sensor 320D may include a tachometer (e.g., for measuring a rotational speed and/or acceleration of a wheel of the vehicle 200), a gyroscope (e.g., for measuring an orientation of a wheel of the vehicle 200), an accelerometer (e.g., for measuring a lateral speed and/or acceleration of a wheel of the vehicle 200), and/or other sensors.

In embodiments, the vehicle sensing system 320 may include a location sensor 320E which may detect, e.g., a location, a speed, a braking pattern, a linear acceleration, a lateral acceleration, a turn smoothness, and/or a turn radius of the vehicle 200. In embodiments, the location sensor 320E may include, e.g., a global positioning unit (which may, e.g., wirelessly communicate with a satellite or other system to calculate a position of the vehicle 200) and/or other sensors.

In embodiments, the vehicle sensing system 320 may include a vehicle operation mode sensor 320F for detecting, e.g., an operation mode or electrical signals regarding the same of the vehicle 200. In embodiments, the vehicle operation mode sensor 320F may include, e.g., sensors coupled to a manual vehicle operation mode selector (e.g., a button, knob, or stick for use by the driver 202) and/or other sensors.

In embodiments, the vehicle sensing system 320 may include an engine mode sensor 320G for detecting, e.g., an engine mode or electrical signals regarding the same of the vehicle 200. In embodiments, the engine mode sensor 320G may include, e.g., sensors coupled to a manual vehicle engine mode selector (e.g., a button, knob, or stick for use by the driver 202), sensors coupled to an engine of the vehicle 200 and/or other sensors.

In embodiments, the vehicle sensing system 320 may include a gear mode sensor 320H for detecting, e.g., a gear mode or electrical signals regarding the same of the vehicle 200. In embodiments, the gear mode sensor 320H may include, e.g., sensors configured to determine a position of a gear shift stick of the vehicle 200 and/or other sensors.

In embodiments, the vehicle sensing system 320 may include a user-interfacing vehicle system 320J for detecting and receiving, e.g., instructions (e.g., from the driver 202 or a passenger of the vehicle 200) regarding the driving or operation of the vehicle 200 via, e.g., a touch screen, voice controls, or other interactive mechanisms. In embodiments, the user-interfacing vehicle system 320J may include digital mechanisms such as, e.g., a touch screen, a digital screen, and/or a digital user interface for controlling aspects of the vehicle 200 such as, e.g., an air conditioning system, a heating system, windshield wipers, a digital user interface, an operation mode, an engine mode, a gear mode, and/or other components, systems, or modalities of the vehicle 200. In embodiments, the user-interfacing vehicle system 320J may further include sensors for biometric analysis of the driver 202 and/or the interaction of the driver 202 with the vehicle 200. For example, the user-interfacing vehicle system 320J may include, in embodiments, a camera (for monitoring, e.g., eyes of the driver 202 to determine, e.g., whether the driver 202 is looking at the road 210), a steering wheel pressure sensor on a steering wheel of the vehicle 200 (for monitoring, e.g., a pressure of a grip of the driver 202 on the steering wheel to determine, e.g., whether the driver 202 has his or her hands on the steering wheel), and/or other such sensors for monitoring the driver 202.

In embodiments, the vehicle sensing system 320 may include a manual user interface system 320K for detecting and receiving, e.g., instructions (e.g., from the driver 202 or a passenger of the vehicle 200) regarding the driving or operation of the vehicle 200 via, e.g., a manual button, knob, or stick. In embodiments, the manual user interface system 320K may include manual mechanisms such as, e.g., buttons, knobs, or sticks for controlling aspects of the vehicle 200 such as e.g., an air conditioning system, a heating system, windshield wipers, an operation mode, an engine mode, a gear mode, and/or other components, systems, or modalities of the vehicle 200.

In embodiments, the vehicle sensing system 320 may include an external vehicle sensor 320L for detecting, e.g., the surroundings of the vehicle 200. In embodiments, the external vehicle sensor 320L may include one or more cameras, radar sensors, wireless connectivity sensors (configured to, e.g., communicate with other vehicles or devices via, e.g., Wi-Fi, WiMax. LTE, 4G, 5G, 6G, Bluetooth, Zigbee, other wireless connection systems, etc.), and/or other sensors. In embodiments, the external vehicle sensor 320L may be used to determine or generate data which may be used to determine actual travel of the vehicle 200 (e.g., linear acceleration data, lateral acceleration data, braking pattern data, turn smoothness data, turn radius data, etc.) through comparison of data regarding the surroundings of the vehicle 200 over time. In embodiments, the external vehicle sensor 320L may be used by an automated driving system of the vehicle 200 for usage in driving (in whole or in part) the vehicle 200.

In embodiments, the vehicle sensing system 320 may include a vehicle software and hardware infrastructure system 320M which may provide, generate, and/or receive signals, as monitored inputs, from any, some, or all of the sensors and/or systems of the vehicle sensing system 320. In embodiments, a vehicle software and hardware infrastructure system 320M may include software for operating (in part and/or in whole), processing instructions from, any, some, or all of the sensors and/or systems of the vehicle sensing system 320 and/or components and/or systems of the vehicle 200. In embodiments, the vehicle software and hardware infrastructure system 320M may include processors, electronic control units, memory, and/or other components for generating, sending, or receiving signals, data, inputs, or outputs.

In embodiments, the vehicle sensing system 320 may include any, some, or all of the pedal sensor 320A, the acceleration sensor 320B, the steering sensor 320C, the wheel sensor 320D, the location sensor 320E, the vehicle operation mode sensor 320F, the engine mode sensor 320G, the gear mode sensor 320H, the user-interfacing vehicle system 320J, the manual user interface system 320K, the external vehicle sensor 320L, the vehicle software and hardware infrastructure system 320M, and/or other sensors, components, or systems. Accordingly, in embodiments, each of the one or more monitored inputs may be generated by any, some, or all sensors and systems of the vehicle sensing system 320, and, in embodiments having some or all of the sensors and systems of the vehicle sensing system 320 as depicted in FIG. 3A, the at least one monitored inputs may be received by only one, only some, or all of the sensors of the vehicle sensing system 320.

As will be understood by persons having ordinary skill in the art, in embodiments, the vehicle sensing system 320 may comprise any other sensors and/or systems which may provide relevant monitored inputs for usage in the method 100. Further, in embodiments, sensors and/or systems of the vehicle sensing system 320 may provide other functions or fulfill other uses of the vehicle 200 in addition to providing monitored inputs of the vehicle 200, and accordingly, in certain such embodiments, any component and/or system of the vehicle 200 may provide monitored inputs in the block 110 of the method 100.

Referring again to FIGS. 1 and 3A, the vehicle computing device 310 may, in embodiments, receive any, some, or all of the one or more monitored inputs of the block 110 from the vehicle sensing system 320. However, in embodiments, the vehicle computing device 310 may receive any, some, or all of the one or more monitored inputs of the block 110 from a source external to the vehicle computing device 310 and/or the vehicle 200 via, e.g., the transceiver 312.

Figure 3B:
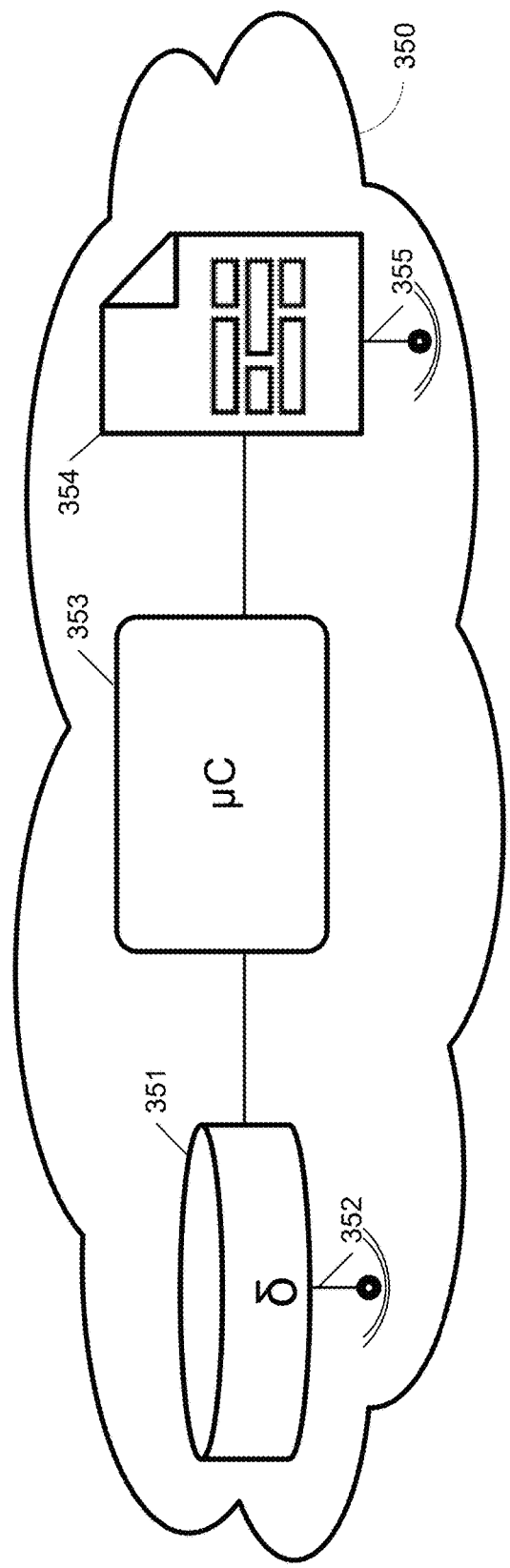
FIG. 3B schematically depicts hardware for detecting a compromised vehicle and for implementing response actions, according to one or more embodiments shown and described herein.
Figure 3B:
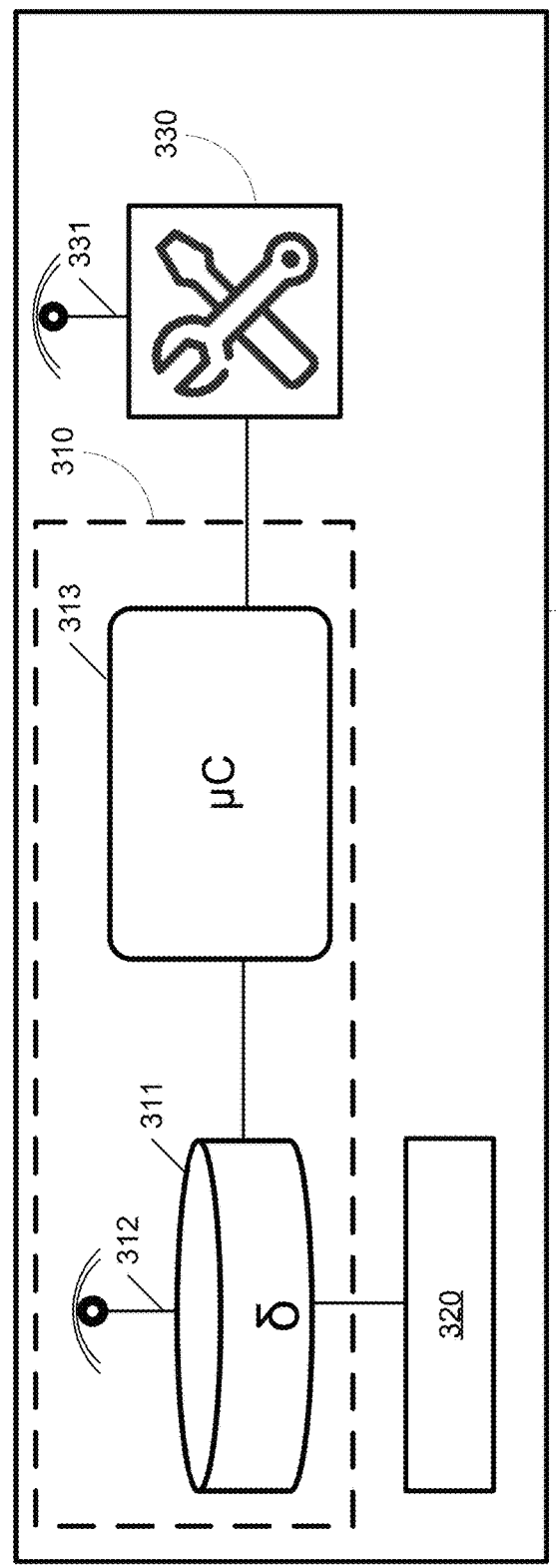
Figure 4:
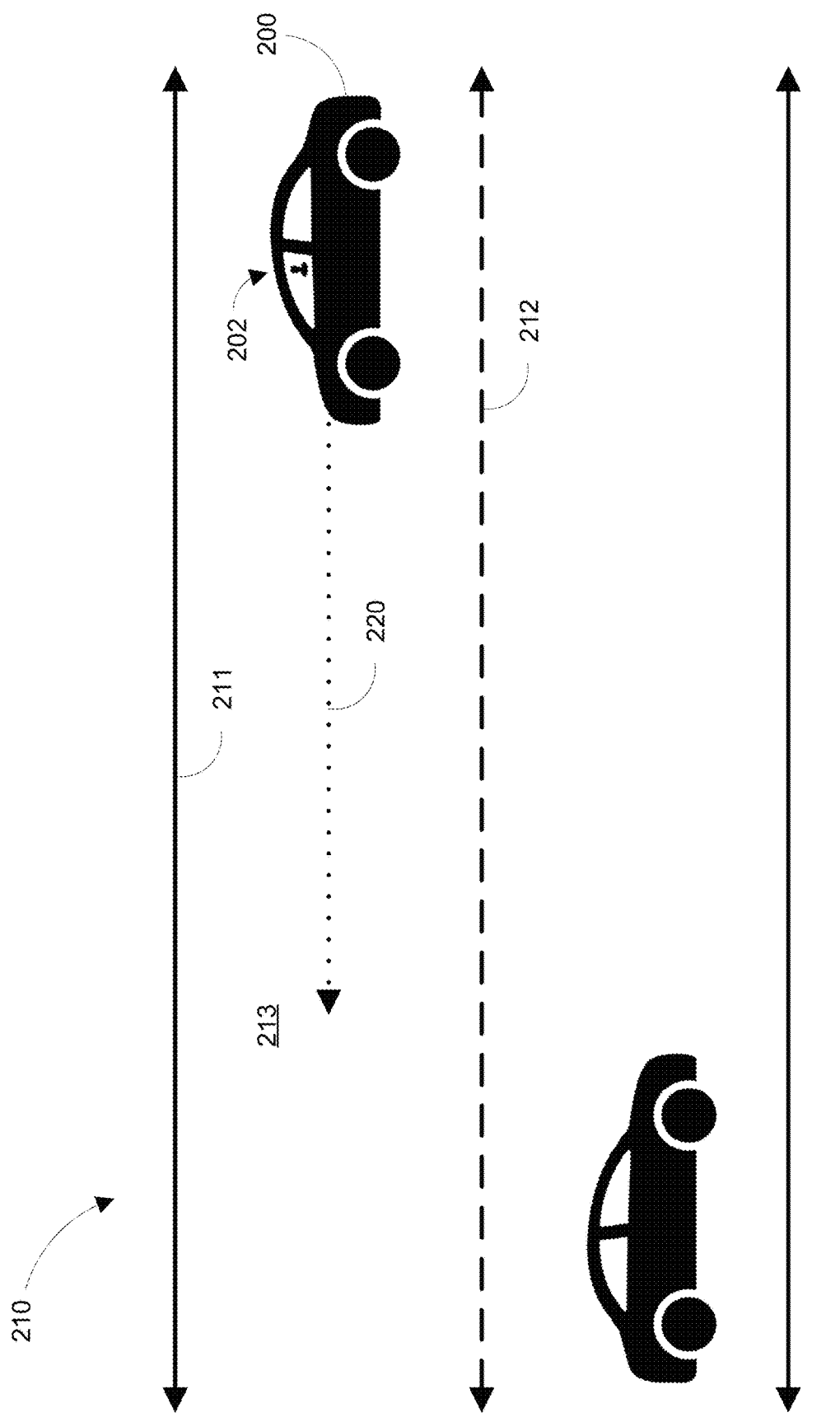
FIG. 4 depicts a vehicle traversing a road and a predicted vehicle trajectory of the vehicle, according to one or more embodiments shown and described herein.

Referring to FIG. 3B, in embodiments, the system 300 may include a remote computing device 350 (e.g., a cloud computing system or other computing device) which, in embodiments, may be coupled (via, e.g., Wi-Fi, WiMax, LTE, 4G, 5G, 6G, Bluetooth, Zigbee, other wireless connection systems, etc.) to the vehicle 200, the vehicle computing device 310, the vehicle sensing system 320, and/or the vehicle control system 330. In embodiments, the remote computing device 350 may include any, some, or all of a remote data memory component 351, a remote vehicle input monitor 353, and/or a remote vehicle input monitor output translator 354. Any, some, or all of the components, systems, and/or processes of the vehicle computing device 310, the vehicle sensing system 320, and/or the vehicle control system 330 (as depicted in, e.g., FIG. 3A) may instead exist within the remote computing device 350, and any, some, or all processes of the method 100 and/or conducted by the vehicle computing device 310, the vehicle sensing system 320, and/or the vehicle control system 330 may instead occur within and/or be conducted by the remote computing device 350. As such, in embodiments, the remote data memory component 351 may conduct any, some, or all functions of the vehicle data memory component 311 separately from, parallel to, and/or in coordination with the vehicle data memory component 311 and, in embodiments, may store any, some, or all of the data and/or logic described above as being stored within the vehicle data memory component 311. In embodiments, the remote vehicle input monitor 353 may conduct any, some, or all functions of the vehicle input monitor 313 separately from, parallel to, and/or in coordination with the vehicle input monitor 313. In embodiments, the remote vehicle input monitor output translator 354 may conduct any, some, or all functions of the vehicle control system 330 separately from, parallel to, and/or in coordination with the vehicle control system 330.

Accordingly, referring to FIGS. 1 and 3B, in the block 110, in embodiments, any, some, or all of the one or more monitored inputs may be generated by the vehicle sensing system 320 and received by the vehicle data memory component 311 and/or the remote computing device 350. Further, in embodiments, any, some, or all of the one or more monitored inputs may be generated by the remote computing device 350 and received by the remote data memory component 351 and/or the vehicle data memory component 311 (via, e.g., a wireless coupling between the transceiver 312 and a transceiver 352 of the remote computing device 350). In certain such embodiments, any, some, or all of the sensors and/or systems of the vehicle sensing system 320 may be included, in part or in whole, in the remote computing device 350. For example, the location sensor 320E may generate monitored inputs corresponding to, e.g., a speed, a linear acceleration, a lateral acceleration, and/or a braking pattern via processing (e.g., of location data and associated time values relating to the vehicle 200) conducted by the remote computing device 350. In embodiments, the generating, processing, receiving, analyzing, and/or changing of any, some, or all inputs of the vehicle sensing system 320, including any, some, or all of the sensors 320A, 320B, 320C, 320D, 320E, 320F, 320G. 320H, 320L and/or the systems 320J, 320K, 320M, may be conducted by the remote computing device 350. In certain such embodiments, any such generating, processing, receiving, analyzing, and/or changing of inputs may be conducted by the remote computing device 350 via edge computation (to, e.g., offload necessary computations of such to the remote computing device 350 due to, e.g., computational power limitations of the vehicle computing device 310).

Referring again to FIG. 1 with reference to FIG. 4, a block 120 of the method 100 includes predicting, using at least one of the monitored inputs, a predicted vehicle trajectory 220. As illustrated in FIG. 4, the predicted vehicle trajectory 220 indicates that the vehicle computing device 310 and/or the remote computing device 350 predicts that the vehicle 200 will remain within the lane 213, as defined by a shoulder line 211 and a median line 212. In embodiments, the predicted vehicle trajectory 220 may include a predicted vehicle trajectory of the vehicle 200 for a pre-determined and/or variable (depending on, e.g., the contents and quality of data included in the at least one monitored inputs) amount of time (e.g., a number of seconds) into the future and/or a pre-determined and/or variable distance to be traveled by the vehicle 200 (e.g., a number of feet, yards, meters, etc.). In embodiments, the predicted vehicle trajectory 220 may be a projection of a predicted traveled distance and direction of the vehicle 200 0.1 seconds into the future, 0.5 seconds into the future, 1 second into the future, 5 seconds into the future, 10 seconds into the future, or any amount of time into the future. In embodiments, the predicted vehicle trajectory 220 may be a projection of a predicted traveled distance and direction of the vehicle 200 1 meter, 10 meters, 100 meters, or any other distance to be traveled by the vehicle 200.

In embodiments, the predicted vehicle trajectory 220 may be predicted via monitored inputs generated by the vehicle sensing system 320. For example, in an embodiment, the pedal sensor 320A may generate data of monitored inputs including pedal throttle pattern inputs caused by depression of an accelerator pedal of the vehicle 200 by the driver 202, and, in embodiments, the pedal throttle pattern inputs may be received by the vehicle computing device 310 and/or the remote computing device 350 and used to predict, by the vehicle input monitor 313 and/or the remote vehicle input monitor 353, the predicted vehicle trajectory 220. In another example, in an embodiment, one or more of the sensors and/or systems of the vehicle sensing system 320 may be used to predict the predicted vehicle trajectory 220, such as, in embodiments, linear acceleration input data generated by the pedal sensor 320A via depression, by the driver 202, of an accelerator pedal of the vehicle 200, lateral acceleration input data generated by the steering sensor 320C via instructions generated by an automated driving system of the vehicle 200 (functioning as, e.g., a driver assist system while the driver 202 drives the vehicle 200) and linear acceleration data generated by a combination of the acceleration sensor 320B (located in, e.g., the vehicle 200) and a location sensor 320E (located in, e.g., either or both of the vehicle 200 and the remote computing device 350). Accordingly, in embodiments, the predicted vehicle trajectory 220 may be predicted by either or both of the vehicle computing device 310 and/or the remote computing device 350 using inputs by one, some, or all sensors and/or systems of the vehicle sensing system 320.

In embodiments, the predicted vehicle trajectory 220 may be predicted via a neural network, deep learning algorithm, an optimization algorithm, and/or other AI algorithm, and, in certain such embodiments, such neural network(s), deep learning algorithm(s), optimization algorithm(s), or other AI algorithm(s) may be stored on either or both of the vehicle data memory component 311 and/or the remote data memory component 351 and executed by either or both of the vehicle input monitor 313 and/or the remote vehicle input monitor 353 (via, e.g., edge computation). In embodiments, the predicted vehicle trajectory may be predicted by a physics simulation algorithm (using, e.g., speed, direction, and rates of change of speed or direction, as determined by, e.g., the monitored inputs generated by the vehicle sensing system 320). In certain such embodiments, the physics simulation algorithm may be stored on either or both of the vehicle data memory component 311 and/or the remote data memory component 351 and executed by either or both of the vehicle input monitor 313 and/or the remote vehicle input monitor 353 (via, e.g., edge computation). In embodiments, the predicted vehicle trajectory 220 may be predicted by a statistical analysis algorithm (using. e.g., a driver profile, as described in further detail below) to predict (based on, e.g., past driver behavior, a location of the vehicle 200, and/or a route of the vehicle 200) probabilities of driving behavior of the driver 202 and/or an automated driving system of the vehicle 200 to determine the predicted vehicle trajectory 220 and/or additional predicted vehicle trajectories and/or associated probability values of each predicted vehicle trajectory. In certain such embodiments, the statistical analysis algorithm may be stored on either or both of the vehicle data memory component 311 and/or the remote data memory component 351 and executed by either or both of the vehicle input monitor 313 and/or the remote vehicle input monitor 353 (via, e.g., edge computation).

In embodiments, either or both of the vehicle computing device 310 and/or the remote computing device 350 may generate a plurality of predicted vehicle trajectories (rather than, e g . . . a sole predicted vehicle trajectory such as the predicted vehicle trajectory 220) by, e.g., separate processing of different monitored inputs of the at least one monitored inputs of the block 110 and/or different methodologies for predicting predicted vehicle trajectories using one or more of the at least one monitored inputs of the block 110. In certain such embodiments, a single predicted vehicle trajectory (e.g., the predicted vehicle trajectory 220) may nonetheless be generated (by, e.g., either or both of the computing devices 310, 350) using the plurality of predicted vehicle trajectories by combining any, some, or all of the plurality of predicted vehicle trajectories (via, e.g., an averaging function, a weighting function, etc.).

Figure 5A:
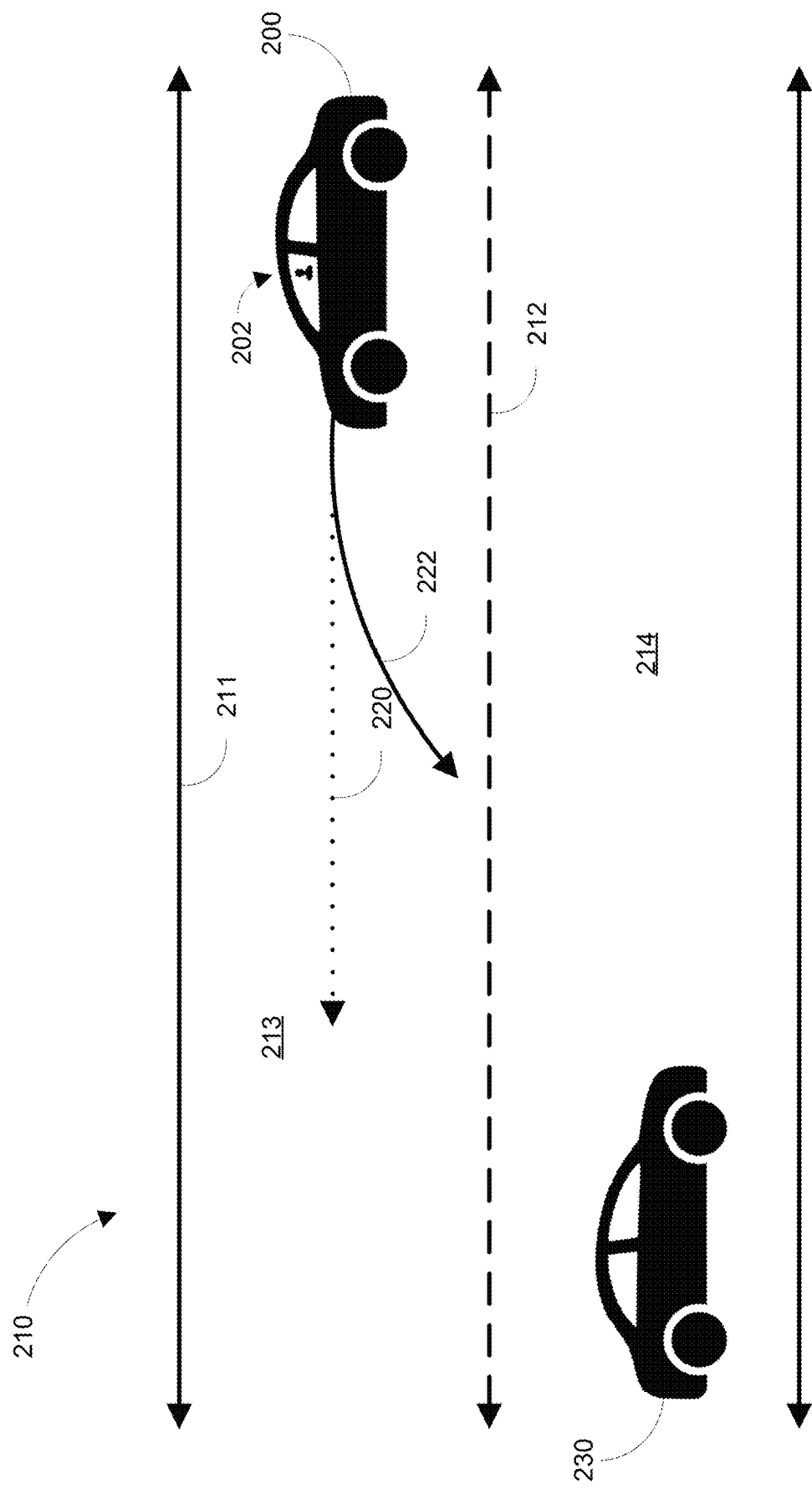
FIG. 5A depicts a vehicle traversing a road, a predicted vehicle trajectory of the vehicle, and a first detected vehicle trajectory of the vehicle, according to one or more embodiments shown and described herein.
Figure 5B:
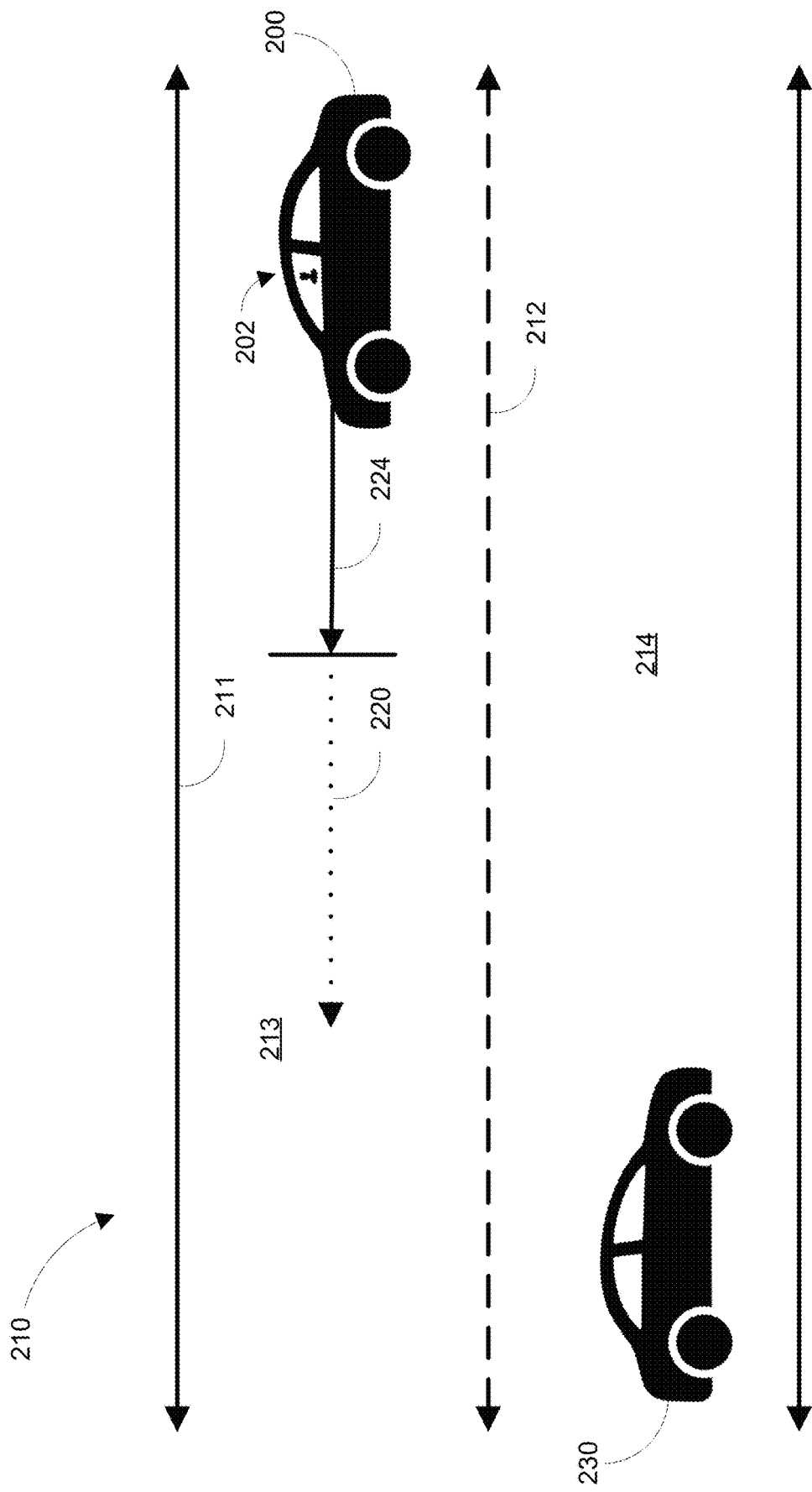
FIG. 5B depicts a vehicle traversing a road, a predicted vehicle trajectory of the vehicle, and a second detected vehicle trajectory of the vehicle, according to one or more embodiments shown and described herein.
Figure 5C:
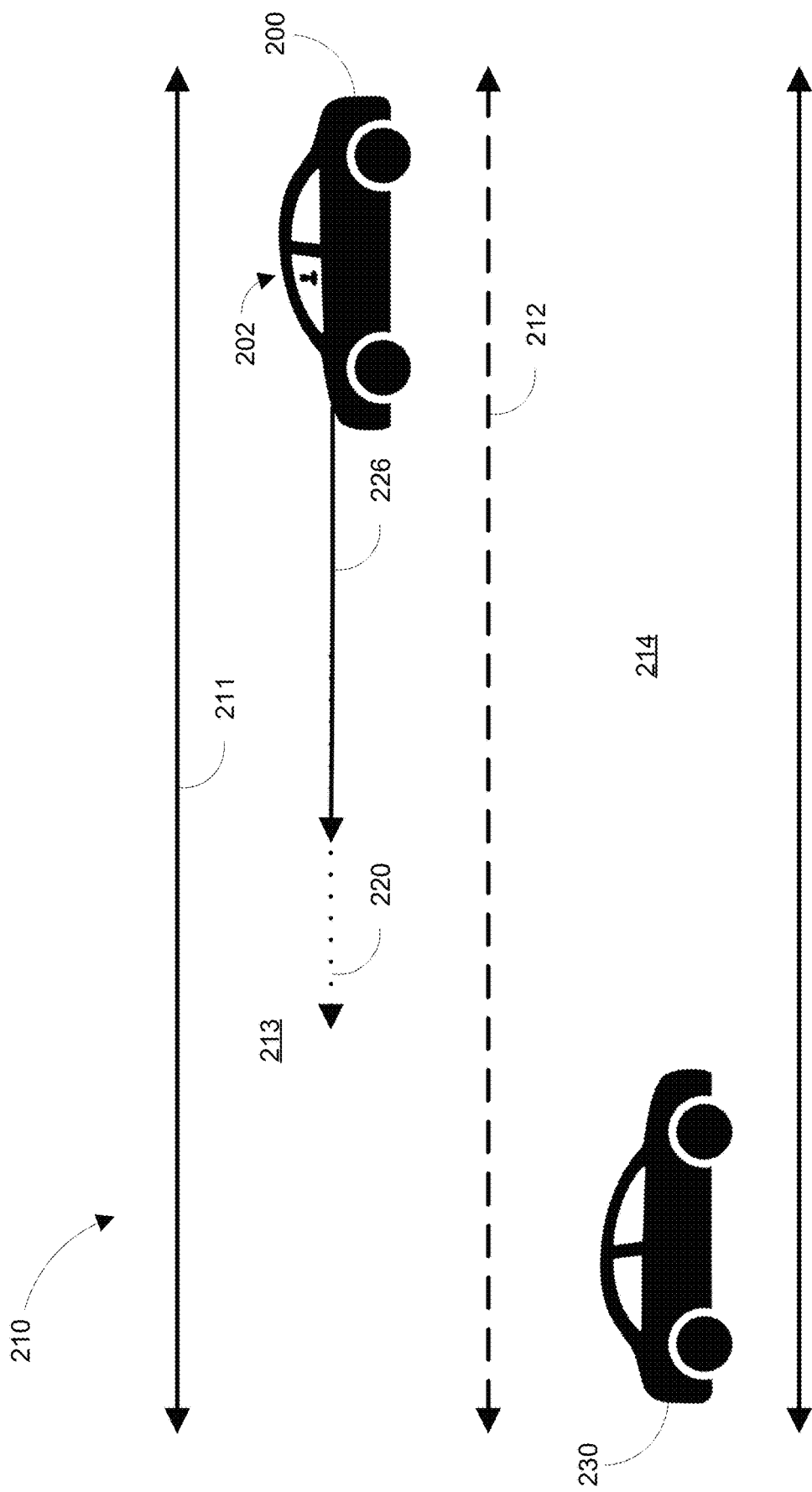
FIG. 5C depicts a vehicle traversing a road, a predicted vehicle trajectory of the vehicle, and a third detected vehicle trajectory of the vehicle, according to one or more embodiments shown and described herein.
Figure 5D:
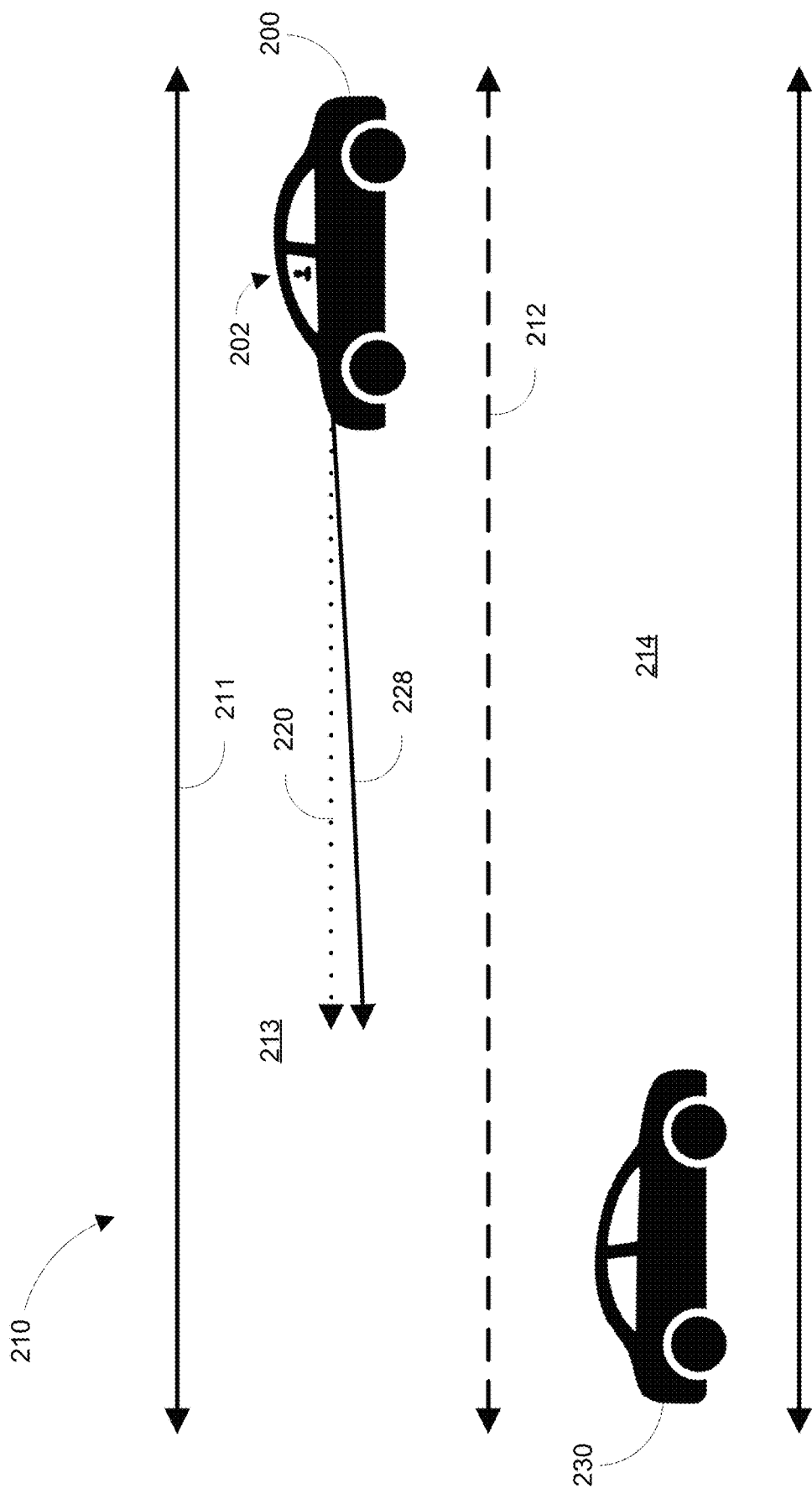
FIG. 5D depicts a vehicle traversing a road, a predicted vehicle trajectory of the vehicle, and a third detected vehicle trajectory of the vehicle, according to one or more embodiments shown and described herein.

Referring again to FIG. 1 with reference to FIGS. 5A-5C, a block 130 of the method 100 includes detecting a detected vehicle trajectory. For example, in the embodiment of FIG. 5A, a first detected vehicle trajectory 222 indicates that the vehicle 200 is traveling, rather than along the predicted vehicle trajectory 220 and within the lane 213, towards an oncoming traffic lane 214 and towards the median line 212. In another example, in the embodiment of FIG. 5B, a second detected vehicle trajectory 224 indicates that the vehicle 200 is stopping, rather than traveling forward as predicted in the predicted vehicle trajectory 220. In another example, in the embodiment of FIG. 5C, a third detected vehicle trajectory 226 indicates that the vehicle 200 is traveling along the predicted vehicle trajectory 220.

Referring again to FIGS. 3A-3B, in embodiments, any, some, or all of the detected vehicle trajectories 222, 224, 226 of the vehicle 200 may be detected by the vehicle sensing system 320 and/or either or both of the vehicle computing device 310 and/or the remote computing device 350 (by, e.g., processing detected data inputs detected by the vehicle sensing system 320). In embodiments, either or both of the vehicle computing device 310 and/or the remote computing device 350 may generate a plurality of detected vehicle trajectories (rather than, e.g., a sole detected vehicle trajectory such as any, some, or all of the detected vehicle trajectories 222, 224, 226) by, e.g., separate processing of different detected data inputs and/or different methodologies for detecting detected vehicle trajectories using one or more detected data inputs. In certain such embodiments, a single detected vehicle trajectory (e.g., any, some, or all of the detected vehicle trajectories 222, 224, 226) may nonetheless be generated (by, e.g., either or both of the computing devices 310, 350) using the plurality of predicted vehicle trajectories by combining any, some, or all of the plurality of detected vehicle trajectories (via. e.g., an averaging function, a weighting function, etc.).

Referring again to FIG. 1, a block 140 of the method 100 includes comparing the predicted vehicle trajectory 220 to the detected vehicle trajectory of block 130 (e.g., in embodiments, any, some, or all of the detected vehicle trajectories 222, 224, 226). In embodiments, the predicted vehicle trajectory 220 may be compared to a detected vehicle trajectory (e.g., in embodiments, any, some, or all of the detected vehicle trajectories 222, 224, 226) by either or both of the vehicle input monitor 313 of the vehicle computing device 310 and/or the remote vehicle input monitor 353 of the remote computing device 350.

Referring to FIG. 5A, in this embodiment, comparing the predicted vehicle trajectory 220 to the first detected vehicle trajectory 222 may, in embodiments, include determining that the first detected vehicle trajectory 222 diverts from the predicted vehicle trajectory 220. Further, in embodiments, comparing the predicted vehicle trajectory 220 to the first detected vehicle trajectory 222 may further include determining that the first detected vehicle trajectory 222 endangers the vehicle 200 by directing the vehicle 200 (e.g., by a malicious third party or software initiating a sharp turn contrary to the operation of the vehicle 200 by the driver 202 or instructions of an automated driving system of the vehicle 200) into the oncoming traffic lane 214 and/or toward an oncoming vehicle 230 (as detected by, e.g., the external vehicle sensor 320L).

Referring to FIG. 5B, in this embodiment, comparing the predicted vehicle trajectory 220 to the second detected vehicle trajectory 224 may, in embodiments, include determining that the second detected vehicle trajectory 224 sharply stops, rather than continuing along the predicted vehicle trajectory 220. Further, in embodiments, comparing the predicted vehicle trajectory 220 to the second detected vehicle trajectory 224 may further include determining that the second detected vehicle trajectory 224 endangers the vehicle 200 by sharply reducing the speed (e.g., by a malicious third party or software initiating braking contrary to the operation of the vehicle 200 by the driver 202 or instructions of an automated driving system of the vehicle 200) of the vehicle 200 (compared to a speed detected by, e.g., the acceleration sensor 320B).

Referring to FIG. 5C, in this embodiment, comparing the predicted vehicle trajectory 220 to the third detected vehicle trajectory 226 may, in embodiments, include determining that the third detected vehicle trajectory 226 is along or substantially similar to the predicted vehicle trajectory 220. Further, in embodiments, comparing the predicted vehicle trajectory 220 to the third detected vehicle trajectory 226 may further include determining that the vehicle 200 (and/or components or systems thereof) is operating normally and, therefore, not being controlled by and/or not appearing to be under the control of, e.g., a malicious third party or software.

However, in embodiments and as described above, even if the vehicle 200 (and/or components or systems thereof) is under the control of a malicious third party or software, operation of the vehicle 200 may not be as drastic or as dangerous to the vehicle 200 as, e.g., the detected vehicle trajectories 224, 226, as the malicious third party or software may nonetheless replicate normal functions of the vehicle 200 per, e.g., the operation of the vehicle 200 by the driver 202 and/or an automated driving system of the vehicle 200.

Rather, referring to FIG. 5D, in embodiments, a fourth detected vehicle trajectory 228 may only differ slightly from the predicted vehicle trajectory 220 and in such a way that does not endanger the vehicle 200 (e.g., by remaining within the lane 213, rather than, as in the embodiment of FIG. 5A, directing the vehicle 200 toward the oncoming vehicle 230). Such differences between the fourth detected vehicle trajectory 228 and the predicted vehicle trajectory 220 may be, in embodiments, benign (e.g., not a result of the vehicle 200 and/or systems and/or components thereof being compromised) due to inaccuracies in the one or more monitored inputs of the block 110 (due to, e.g., faults in sensors or systems of the vehicle sensing system 320) or due to undetected environmental factors causing differences between the predicted vehicle trajectory 220 and the fourth detected vehicle trajectory 228 (due to, e.g., an undetected increase in a slope or angle of the lane 213). However, and as described above and in further detail below, such differences may alternatively, in embodiments, indicate that the vehicle 200 (and/or components and/or systems thereof) is compromised and is, e.g., under the control of a malicious third party or software which is concealing the compromised nature of the vehicle 200 by replicating normal function of the vehicle 200 but nonetheless causing differences between the predicted vehicle trajectory 220 and the fourth detected vehicle trajectory 228 due to, e.g., latency in systems and/or components of the vehicle 200 caused by the compromised nature of the vehicle 200. Accordingly, in embodiments, while deviations between the monitored inputs of the driver 202 and the detected vehicle trajectories 224, 226 may be noticeable to the driver 202, more minor deviations, such as those between the predicted vehicle trajectory 220 and the fourth detected vehicle trajectory 228, may be unnoticeable to the human eye (e.g., by a malicious third party or software compromising the vehicle 200 and introducing an added latency between inputs of the driver 202 and receipt of those inputs by systems and/or components of the vehicle 200), the deviations may nonetheless be detectable by the system 300 (e.g., via the vehicle computing device 310 and/or the remote computing device 350) to identify that the vehicle 200 is compromised. In certain such embodiments, the system 300 (via, e.g., the vehicle computing device 310 and/or the remote computing device 350) may be capable of detecting minor deviations (e.g., between the predicted vehicle trajectory 220 and the fourth detected vehicle trajectory 228) by analyzing tens, hundreds, and/or even thousands of monitored inputs and doing so in a time frame of less than ten seconds, less than five seconds, and/or even less than one second. Accordingly, in embodiments, even in circumstances wherein the vehicle 200 is compromised but the compromised nature does not (yet) pose an immediate threat of damage to the vehicle 200, the compromised nature of the vehicle 200 may nonetheless be detected.

Referring again to FIGS. 1 and 3A-3B, a block 150 of the method 100 includes determining a trajectory deviation value of the predicted vehicle trajectory 220 and a detected vehicle trajectory (e.g., in embodiments, any, some, or all of the detected vehicle trajectories 222, 224, 226, 228). In embodiments, a trajectory deviation value may be a function of differences in any, some, or all of a speed, braking pattern, linear acceleration, lateral acceleration, turn smoothness, turn radius, operation mode, engine mode, gear mode, and/or other detected differences in operation, velocity, and/or direction of a detected vehicle trajectory (e.g., in embodiments, any, some, or all of the detected vehicle trajectories 222, 224, 226, 228) of the vehicle 200 when compared to the predicted vehicle trajectory 220. In embodiments, a trajectory deviation value may have a magnitude (e.g., on a scale of 1-10), wherein the magnitude of the trajectory deviation value indicates an extent to which a detected vehicle trajectory (e.g., in embodiments, any, some, or all of the detected vehicle trajectories 222, 224, 226, 228) deviates from the predicted vehicle trajectory 220. Accordingly, in embodiments, a calculated magnitude of the trajectory deviation value may be a function of the magnitude of differences between the predicted vehicle trajectory 220 and any, some, or all of a detected vehicle trajectory (e.g., in embodiments, any, some, or all of the detected vehicle trajectories 222, 224, 226, 228), speed, braking pattern, linear acceleration, lateral acceleration, turn smoothness, turn radius, operation mode, engine mode, gear mode, and/or other detected operations of the vehicle 200 (e.g., a residual value between, e.g., a location, velocity, and/or direction of the predicted vehicle trajectory 220 and a location, velocity, and/or direction of a detected vehicle trajectory). In embodiments, the trajectory deviation value may be determined by either or both of the vehicle input monitor 313 of the vehicle computing device 310 and/or the remote vehicle input monitor 353 of the remote computing device 350.

For example, referring to the embodiments of FIGS. 5A-5D, comparing the detected vehicle trajectories 222, 224 to the predicted vehicle trajectory 220, in the block 140, may cause, in the block 150, a trajectory deviation value to be calculated which is greater in magnitude than a trajectory deviation value calculated by comparing the fourth detected vehicle trajectory 228 to the predicted vehicle trajectory 220 due to, e.g., the detected vehicle trajectories 222, 224 differing from the predicted vehicle trajectory 220 to a greater degree than the fourth detected vehicle trajectory 228. Further, in embodiments, comparing the second detected vehicle trajectory 224 to the predicted vehicle trajectory 220 may cause a trajectory deviation value to be calculated which has a lesser magnitude than a trajectory deviation value calculated by comparing the first detected vehicle trajectory 222 to the predicted vehicle trajectory 220 due to, e.g., the second detected vehicle trajectory 224 following the predicted vehicle trajectory 220 more closely than the first detected vehicle trajectory 222 and/or the second detected vehicle trajectory 224 occurring due to, e.g., the driver 202 sharply braking faster than the system 300 can generate a new predicted vehicle trajectory based on the braking by the driver 202.

In embodiments, comparing the third detected vehicle trajectory 226 to the predicted vehicle trajectory 220, in the block 140, may cause, in the block 150, a trajectory deviation value to be calculated which is smaller, in magnitude, than a trajectory deviation value calculated based on comparison of the predicted vehicle trajectory 220 to the detected vehicle trajectories 222, 224, 228, as the third detected vehicle trajectory 226 more closely follows the predicted vehicle trajectory 220. However, comparing the predicted vehicle trajectory 220 to the third detected vehicle trajectory 226 may nonetheless result in the calculation of a non-zero trajectory deviation value (e.g., because the third detected vehicle trajectory 226 does not extend as far as the predicted vehicle trajectory 220).

Referring again to FIG. 1, a block 160 of the method 100 includes, in response to determining that the trajectory deviation value (determined in, e.g., the block 150) exceeds a trajectory deviation threshold, generating a response action. In embodiments, the trajectory deviation value may be determined to exceed a trajectory deviation threshold by either or both of the vehicle input monitor 313 of the vehicle computing device 310 and/or the remote vehicle input monitor 353 of the remote computing device 350. In embodiments, the response action may be generated by either or both of the vehicle input monitor 313 of the vehicle computing device 310 and/or the remote vehicle input monitor 353 of the remote computing device 350. In embodiments, one response action may be generated in the block 160. In embodiments, a plurality of response actions may be generated in the block 160.

In embodiments, a trajectory deviation threshold may be pre-determined, and, in certain such embodiments, a trajectory deviation threshold may be pre-determined based on, e.g., methodologies used to calculate trajectory deviation values and/or statistically normal deviations (e.g., within a standard deviation) between detected and predicted vehicle trajectories. For example, in embodiments, trajectory deviation values of the detected vehicle trajectories 222, 224 and the predicted vehicle trajectory 220 may exceed a pre-determined trajectory deviation value while a trajectory deviation value of the third detected vehicle trajectory 226 and the predicted vehicle trajectory 220 may not exceed the pre-determined trajectory deviation value. However, a trajectory deviation threshold may not be fixed, and may instead vary with, e.g., technological improvements which improve the capacity of the system 300 to calculate predicted vehicle trajectories, conditions in which the vehicle 200 is operating (for example, the trajectory deviation threshold may raise in higher-variance driving conditions, such as high wind or ice on the road 210), degradation in quality of sensors and/or systems of the vehicle sensing system 320, and other changing circumstances. Accordingly, in embodiments, in a first context (e g . . . substantially ideal driving conditions on the road 210), a trajectory deviation value may exceed a trajectory deviation threshold, while, in a second context (e.g., wherein the road 210 is icy), the same trajectory deviation value may not exceed a trajectory deviation threshold. Accordingly, in the embodiment of FIG. 5D, the fourth detected vehicle trajectory 228 and the predicted vehicle trajectory 220 may, in the aforementioned first context, result in a determined trajectory deviation value which exceeds a trajectory deviation threshold, while, in the aforementioned second context, the determined trajectory deviation value may not exceed a trajectory deviation threshold. In embodiments, a trajectory deviation value may be associated with a confidence interval while a trajectory deviation threshold may be fixed, such that factors (such as those described above) which may reduce the accuracy of the predicted vehicle trajectory 220 may instead result in a lower confidence interval associated with the predicted vehicle trajectory 220 and, accordingly, a lower trajectory deviation value of the predicted vehicle trajectory 220 and one or more of the detected vehicle trajectories 222, 224, 226, 228.

In embodiments, a trajectory deviation value may be determined, in part or in whole, by a safety threshold. In embodiments, a safety threshold may indicate a level of risk to the vehicle 200 and/or the driver 202 posed by the predicted vehicle trajectory 220. In embodiments, a safety threshold may be exceeded due to, e.g., the predicted vehicle trajectory 220 indicating that the vehicle 200 will drive out of the lane 213, collide with another vehicle in the road 210, and/or otherwise endanger the vehicle 200 and/or the driver 202. For example, with reference to FIG. 5A, if the predicted vehicle trajectory 220 was predicted to, rather than follow the predicted vehicle trajectory 220 depicted in FIG. 5A, instead follow the first detected vehicle trajectory 222, the predicted vehicle trajectory 220 may exceed a safety threshold due to a risk of the vehicle 200 entering the oncoming traffic lane 214 and risking, e.g., colliding with the oncoming vehicle 230. In embodiments, a safety threshold may also be exceeded and/or variable dependent by detecting of the driver 202 (via, e.g., cameras and/or steering wheel pressure sensors of the user-interfacing vehicle system 320J, as described above with reference to FIG. 3A). For example, in embodiments, a camera of the vehicle software and hardware infrastructure system 320M may detect that the driver 202 is not looking at the road 210, and so, upon detecting such, a safety threshold may be exceeded and/or a safety threshold (compared against, e.g., the predicted vehicle trajectory 220) may be reduced. As another example, in embodiments, a steering wheel pressure sensor of the vehicle software and hardware infrastructure system 320M may detect that the driver 202 does not have his or her hands on a steering wheel of the vehicle 200 and so, upon detecting such, a safety threshold may be exceeded and/or a safety threshold (compared against, e.g., the predicted vehicle trajectory 220) may be reduced.

Upon determining that a trajectory deviation value of the predicted vehicle trajectory 220 and a detected vehicle trajectory (e.g., in embodiments, any, some, or all of the detected vehicle trajectories 222, 224, 226, 228), in embodiments, either or both of the vehicle input monitor 313 and/or the remote vehicle input monitor 353 may generate a response action. In embodiments, a response action may be any action which may increase the safety of the vehicle 200 and/or the driver 202 (e.g., by controlling or halting components or systems of the vehicle 200 to prevent the vehicle 200 from following a detected trajectory) and/or address or remedy the potential or actual comprised nature of the vehicle 200. For example, in embodiments, a response action may include at least one of a security sweep, a shut-off of connectivity of the vehicle 200, an alert to the driver 202 and/or passengers of the vehicle 200, an alert to a third party, a shut-off of the vehicle 200, a shut-off of a component of the vehicle 200, a shut-off of a system of the vehicle 200, an override instruction, an instruction check, or a combination thereof. In embodiments, a security sweep may include a security check of the vehicle 200 (and/or components and/or systems thereof) by a security system of the vehicle 200 to evaluate whether or not the vehicle 200 (and/or components and/or systems thereof) may be compromised. In embodiments, a shut-off of connectivity of the vehicle 200 may include ceasing connections (via, e.g., Wi-Fi, WiMax, LTE, 4G, 5G, 6G, Bluetooth, Zigbee, other wireless connection systems, etc.) between the vehicle 200 (and/or components and/or systems thereof) and any, some, or all of external vehicles, systems, software, and/or computing devices. In embodiments, an alert to the driver 202 and/or passengers of the vehicle 200 may include one or more visual alerts (e.g., via the user-interfacing vehicle system 320J, displays of the vehicle 200, and/or other visual signals of the vehicle 200) and/or audio alerts (via, e.g., speakers of the vehicle 200) alerting the driver 202 and/or passengers of the vehicle 200 that the vehicle 200 (and/or components and/or systems thereof) may be compromised by, e.g., describing the potential or actual systems and/or components of the vehicle 200 which may be affected by the potential or actual compromised nature of the vehicle 200, describing how the system 300 is addressing the potential or actual compromised nature of the vehicle 200 (including, e.g., describing other response actions being employed by the system 300), and/or conveying any other pertinent information regarding the vehicle 200 (and/or components and/or systems thereof) and/or the actual or potential compromised nature of the vehicle 200. In embodiments, an alert to a third party may include one or more visual alerts, audio alerts, and/or signal transmission alert to a third party. In embodiments, a visual alert to a third party may include, e.g., illuminating exterior signals (e.g., hazard lights or other warning lights) of the vehicle 200 to inform other vehicles (e.g., the oncoming vehicle 230) or persons near the vehicle 200 that the vehicle 200 is, e.g., potentially and/or actually compromised, posing a threat to other vehicles or persons around it, and/or otherwise not functioning properly. In embodiments, an audio alert to a third party may include, e.g., playing, through speakers of the vehicle 200 alerting other vehicles (e.g., the oncoming vehicle 230) that the vehicle 200 is, e.g., potentially and/or actually compromised, posing a threat to other vehicles or persons around it, and/or otherwise not functioning properly. In embodiments, a signal transmission alert to a third party may be a (wired or wireless) communication by the system 300 to a third party (e.g., other vehicles nearby the vehicle 200, emergency services, and/or other third parties which may assist or desire to avoid the vehicle 200 if the vehicle 200 is compromised) via, e.g., a telecommunication network (e.g., calling emergency services), electrical signals (e.g., alerting other compromised vehicle response systems, a manufacturer of the vehicle 200, and/or emergency services), electromagnetic signals (via, e.g., radio waves, Wi-Fi, WiMax, LTE, 4G, 5G, 6G, Bluetooth, Zigbee, other wireless connection systems, etc. to alert, e.g., other nearby vehicles, a manufacturer of the vehicle 200, and/or emergency services). In embodiments, a shut-off of the vehicle 200, a component of the vehicle 200, and/or a system of the vehicle 200 may include disabling, powering off, or otherwise ceasing functionality of the vehicle 200, a component of the vehicle 200, and/or a system of the vehicle 200. In embodiments, an override instruction may include an instruction (e.g., from the vehicle computing device 310 and/or the remote computing device 350) for the vehicle 200 and/or a component and/or system thereof to ignore an operation instruction of a component and/or system of the vehicle (e.g., ceasing an instruction from a braking system of the vehicle 200 to engage a parking brake of the vehicle 200 when the braking is resulting or will result in the third detected vehicle trajectory 226). In embodiments, an instruction check may include a signal transmission to a component and/or system of the vehicle 200 from which an instruction is received (e.g., an instruction to engage a braking system of the vehicle 200 which is resulting or will result in the third detected vehicle trajectory 226) to confirm that the instruction is valid (rather than, e.g., the result of a system error resulting in a faulty instruction).

Figure 6:
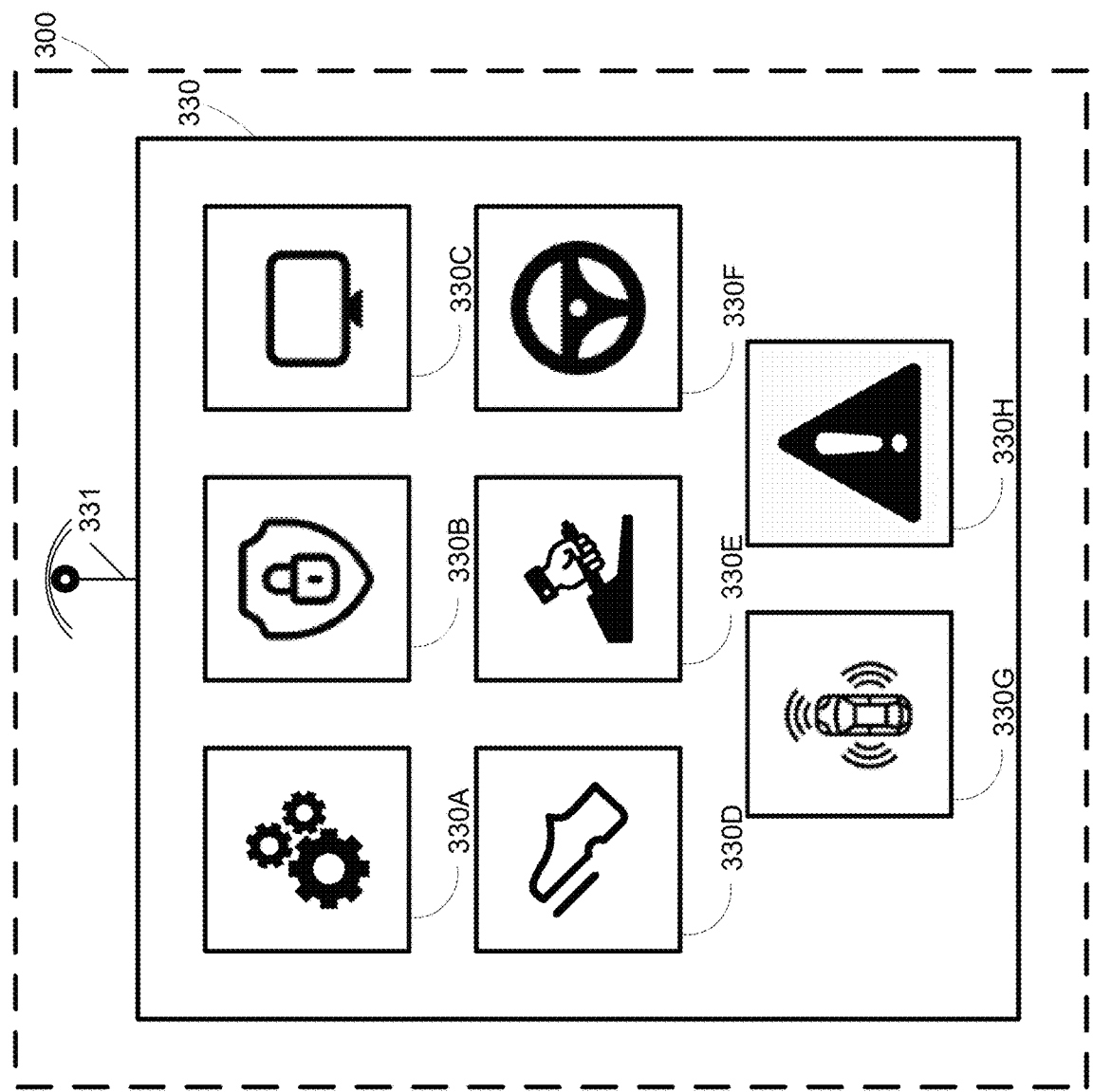
FIG. 6 schematically depicts hardware for implementing response actions, according to one or more embodiments shown and described herein.

Referring to FIGS. 1 and 6, a block 170 of the method 100 includes implementing the response action. In embodiments, a response action may be implemented by the vehicle control system 330, the vehicle computing device 310, the remote computing device 350, a component and/or system of the vehicle 200, and/or any external computing device or hardware to which the vehicle 200 may be electrically coupled (via, e.g., Wi-Fi, WiMax, LTE, 4G, 5G, 6G, Bluetooth, Zigbee, other wireless connection systems, etc.). In embodiments, the vehicle control system 330 may include any component and/or system which, in whole or in part, controls an aspect of a vehicle's functionality. In embodiments, a single response action may be implemented by one or more of the components and/or systems of the vehicle control system 330, the vehicle computing device 310, and/or the remote computing device 350. Since, in embodiments, in the block 160, a plurality of response actions may be generated, in certain such embodiments, in the block 170, a plurality of response actions may be implemented (via. e.g., one or more components and/or systems of the vehicle control system 330, the vehicle computing device 310, and/or the remote computing device 350). In embodiments wherein a response action is generated, in the block 160, by the vehicle input monitor 313, the response action may be communicated (via, e.g., a local communications interface of the system 300 coupling the vehicle computing device 310 to the vehicle control system 330), in the block 170, to the vehicle control system 330 as an instruction to implement the response action. In embodiments wherein a response action is generated by the remote computing device 350, the response action may be communicated (via, e.g., a transceiver 355 of the remote computing device 350) to a transceiver 331 of the vehicle control system 330 as an instruction to implement the response action.

In embodiments, the vehicle control system 330 may include a vehicle mode controller 330A for controlling, e.g., an operation mode, an engine mode, and/or a gear mode of the vehicle 200. Accordingly, in embodiments, the vehicle mode controller 330A may implement a response action of, e.g., shutting off an engine of the vehicle 200, receiving (e.g., from the vehicle computing device 310 and/or the remote computing device 350) an override instruction and/or an instruction check regarding an instruction of the vehicle mode controller 330A (e.g., an instruction to switch an engine mode of the vehicle 200 from "drive" into "reverse" while the vehicle 200 is driving in the road 210), shutting off connectivity of the vehicle mode controller 330A to an automated driving system 330G of the vehicle 200 (as is described in further detail below), and/or other response actions.

In embodiments, the vehicle control system 330 may include a vehicle security system 330B (configured as, e.g., software and/or a non-transitory computer-readable medium executed by the vehicle computing device 310 and/or the remote computing device 350) which may be configured to secure digital and/or physical systems and/or components of the vehicle 200 against security threats (e.g., malicious third parties and/or software) and/or monitor digital and/or physical systems and/or components of the vehicle 200 to detect potential signs that components and/or systems of the vehicle 200 have been compromised. Accordingly, in embodiments, the vehicle security system 330B may implement a response action of, e.g., conducting a security sweep of one or more systems and/or components of the vehicle 200 (e.g., the vehicle software and hardware infrastructure system 320M), sending an override instruction and/or an instruction check to a system and/or component of the vehicle 200, shutting off connectivity of a system and/or component of the vehicle 200, shutting off the vehicle 200, shutting off a component of the vehicle 200, shutting off a system of the vehicle 200, and/or other response actions.

In embodiments, the vehicle control system 330 may include a vehicle user-interfacing display 330C which may provide a graphical display for the driver 202 and/or another passenger of the vehicle 200. Accordingly, in embodiments, the vehicle user-interfacing display 330C may implement a response action of, e.g., an alert to the driver 202 of the vehicle 200 by displaying a visual alert or playing an audio alert (e.g., via speakers of the vehicle 200 and/or of the vehicle user-interfacing display 330C) and/or other response actions.

In embodiments, the vehicle control system 330 may include a vehicle acceleration controller 330D. In embodiments, the vehicle acceleration controller 330D may include a system for controlling acceleration of the vehicle 200 including, e.g., an accelerator pedal, an engine, and/or systems controlling the operation thereof of the vehicle 200. Accordingly, in embodiments, the vehicle acceleration controller 330D may implement a response action of, e.g., shutting off an engine or other component of the vehicle 200, shutting off connectivity of the vehicle acceleration controller 330D (and/or a system and/or component thereof) to the automated driving system 330G, receiving an instruction check and/or an override instruction, and/or other response actions.

In embodiments, the vehicle control system 330 may include a vehicle braking controller 330E. In embodiments, the vehicle braking controller 330E may include a system for controlling braking of the vehicle 200 including, e.g., a brake pedal, a drum brake, a parking brake, a parking brake stick, and/or systems controlling the operation thereof of the vehicle 200. Accordingly, in embodiments, the vehicle braking controller 330E may implement a response action of, e.g., shutting off a parking brake or other component of the vehicle 200, shutting off connectivity of the vehicle braking controller 330E (and/or a system and/or component thereof) to the automated driving system 330G, receiving an instruction check and/or an override instruction, and/or other response actions.

In embodiments, the vehicle control system 330 may include a vehicle steering controller 330F. In embodiments, the vehicle steering controller 330F may include a system for controlling steering of the vehicle 200 including, e.g., a steering wheel, an axle connecting wheels of the vehicle 200 and/or a control system thereof, and/or systems controlling the operation thereof of the vehicle 200. Accordingly, in embodiments, the vehicle steering controller 330F may implement a response action of, e.g., shutting off a steering wheel or other component of the vehicle 200, shutting off connectivity of the vehicle steering controller 330F (and/or a system and/or component thereof) to the automated driving system 330G, receiving an instruction check and/or an override instruction, and/or other response actions.

In embodiments, the vehicle control system 330 may include an automated driving system 330G which may include a combination of software and/or hardware which is configured to, instead of or alongside of the driver 202 (e.g., as a driver assist feature), drive and/or otherwise operate the vehicle 200. Accordingly, in embodiments, the automated driving system 330G may implement a response action of, e.g., shutting off the automated driving system 330G, overriding instructions of the automated driving system 330G (e.g., to any, some, or all of the vehicle mode controller 330A, the vehicle acceleration controller 330D, the vehicle braking controller 330E, and/or the vehicle steering controller 330F), receiving an instruction check and/or an override instruction, and/or other response actions.

In embodiments, the vehicle control system 330 may include a pre-collision system 330H which may be configured to control components and/or systems of the vehicle 200 (e.g., any, some, or all of the vehicle mode controller 330A, the vehicle acceleration controller 330D, the vehicle braking controller 330E, and/or the vehicle steering controller 330F) in circumstances wherein the pre-collision system 330H determines (e.g., via the external vehicle sensor 320L) that the vehicle 200 is about to collide with an external object (e.g., the oncoming vehicle 230) and accordingly control, in whole or in part, components and/or systems of the vehicle 200 to prevent and/or mitigate damage from the impending collision (e.g., by activating brakes of the vehicle 200). Accordingly, in embodiments, the pre-collision system 330H may implement a response action of, e.g., shutting off the pre-collision system 330H, overriding instructions of the pre-collision system 330H (e.g., to any, some, or all of the vehicle mode controller 330A, the vehicle acceleration controller 330D, the vehicle braking controller 330E, and/or the vehicle steering controller 330F), receiving an instruction check and/or an override instruction, and/or other response actions.

As is described above, in embodiments, sensors and/or systems of the vehicle sensing system 320 may perform functions separate of providing monitored inputs, in embodiments, any, some, or all of the systems and/or sensors of the vehicle sensing system 320 may also be included in the vehicle control system 330. For example, in embodiments, the location sensor 320E may be included in the vehicle control system 330 and may implement a response action of, e.g., sending an alert to a third party (e.g., sending a location of the vehicle 200 to emergency services).

In embodiments, a compromised vehicle may also be detected by comparing monitored inputs to a driver profile. It should be understood that the term "driver profile" as used herein refers to a data structure which is built by logging the behavior of a (human or automated) driver of a vehicle (e.g., the driver 202 and/or the automated driving system 330G) which may be used to predict common behavior of the driver. In embodiments, a driver profile may include logging (by, e.g., the vehicle computing device 310 and/or the remote computing device 350) inputs (including, e.g., any, some, or all of the monitored inputs described above) and using the logged inputs to create a baseline from which future driving behavior of the driver can be compared against to determine whether the driver's behavior matches the driver profile (e.g., by behaving similarly to how the driver has driven in the past). For example, a driver profile may include an acceleration profile, which may be used to predict how the driver will accelerate in contexts similar to those in which data has been logged to create the driver profile (e.g., how fast a driver may accelerate upon a red light, behind which the driver's vehicle is stopped, turning green). In embodiments, a driver profile may include data relating to any, some, or all of acceleration history of a driver (e.g., an "acceleration profile), braking history of a driver (e.g., a "braking" profile), steering history (including, e.g., lateral acceleration, turn smoothness, and/or turn radius) of a driver (e.g., a "steering profile"), and/or other data. In embodiments, a driver profile may include data relating to a driver's behavior at specific coordinates (e.g., a stop sign which the driver regularly slows, rather than completely stops, at, on ramps, etc.).

In embodiments, a driver profile may be generated by validating a particular driver to determine who or what is driving a vehicle (e.g., logging when the automated driving system 330G is driving the vehicle 200, logging when the driver 202 is driving the vehicle 200, and logging when another regular driver of the vehicle 200 is driving the vehicle 200) by, e.g., using biometric analysis (e.g., identifying a face, voice, or fingerprint of the driver 202), requiring a driver manually identify themselves (e.g., via the user-interfacing vehicle system 320J), otherwise sensing a driver (via, e.g., a particular key used to operate the vehicle 200 and/or connection of a device, such as a phone via Bluetooth, of the driver to the vehicle 200), and/or observationally determining a particular driver (e.g., via comparison of monitored inputs to previously logged inputs and/or monitoring of the predicted vehicle trajectory 220). Accordingly, in embodiments, a driver profile can predict and/or analyze the behavior of a driver by generating, e.g., standard deviations of driver inputs and/or actions, confidence intervals (e.g., Bayesian confidence intervals) associated with monitored driver inputs and/or detected vehicle trajectories when compared to the driver profile. Further, in embodiments, a driver profile may be used to determine that a human driver of a vehicle is not a driver with an existing driver profile (and instead, e.g., a hijacker of the vehicle). In embodiments, a driver profile may be a digital twin of a driver stored, in certain such embodiments, the vehicle data memory component 311 and/or the remote data memory component 351.

Figure 7:
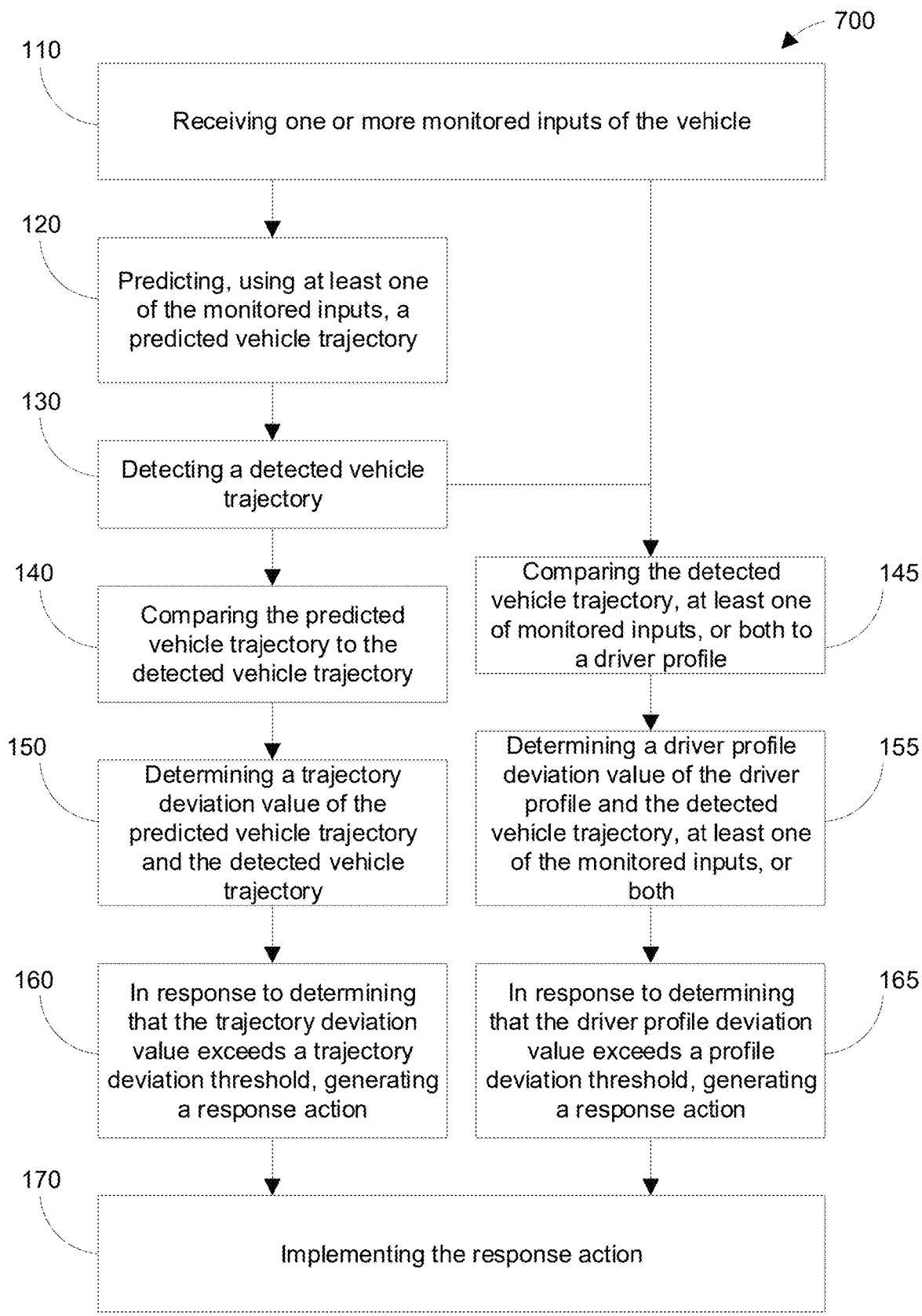
FIG. 7 is a flow diagram of a second method for responding to the detection of a compromised vehicle, according to one or more embodiments shown and described herein.

Referring now to FIG. 7, in embodiments, a method 700 for detecting and responding to the detection of a compromised vehicle may include blocks 110, 120, 130, 140, 150, 160, 170 of the method 100 and may further or alternatively include additional blocks (including, in embodiments, any, some, or all of blocks 145, 155, 165, as described in further detail below) relating to analysis of driver profiles. In embodiments, any, some, or all of the blocks 145, 155, 165 may occur concurrently, before, or after any, some or all of the blocks 110, 120, 130, 140, 150, 160. In embodiments, the method 700 may not include any, some, or all of the blocks 110, 120, 130, 140, 150, 160.

Accordingly, in an embodiment, a block 145 of the method 700 includes comparing a detected vehicle trajectory (e.g., any, some, or all of the detected vehicle trajectories 222, 224, 226, 228), at least one of the monitored inputs (e.g., the at least one monitored inputs of the block 110), or both to a driver profile (of, e.g., the driver 202 and/or the automated driving system 330G). For example, in embodiments, the third detected vehicle trajectory 226 may be compared to a driver profile of the driver 202. In embodiments, the detected vehicle trajectory, monitored inputs, or both may be compared to the driver profile by the vehicle computing device 310 and/or the remote computing device 350.

In embodiments, a block 155 of the method 700 includes determining a driver profile deviation value of the driver profile and a detected vehicle trajectory (e.g., any, some, or all of the detected vehicle trajectories 222, 224, 226, 228), at least one of the monitored inputs (e.g., of the block 110), or both. In embodiments, determining a driver profile deviation value of the driver profile may include comparing a detected vehicle trajectory (e.g., any, some, or all of the detected vehicle trajectories 222, 224, 226, 228), at least one of the monitored inputs (e.g., of the block 110), or both to, for example, one or more of a standard deviation predicted by the driver profile, a confidence interval of the driver profile, and/or other contents of the driver profile. In embodiments, a driver profile deviation value may have a magnitude (e.g., on a scale of 1-10), wherein the magnitude of the driver profile deviation value indicates an extent to which the detected vehicle trajectory, monitored inputs, or both deviate from trajectories and/or inputs that the driver profile predicts and/or expects. In embodiments, the driver profile deviation value may be determined by the vehicle computing device 310 and/or the remote computing device 350.

For example, referring to FIG. 5C, an acceleration profile of a driver profile of the driver 202 may, in an embodiment, predict the driver 202 to accelerate the vehicle 200 such that the vehicle 200 follows the predicted vehicle trajectory 220. However, in the same example, comparing the third detected vehicle trajectory 226 to the predicted vehicle trajectory 220 may indicate that the vehicle 200 is accelerating more slowly (as indicated by the shorter length of the third detected vehicle trajectory 226 when compared to the predicted vehicle trajectory 220) than predicted by the driver profile of the driver 202. Accordingly, in the same example, the differences between the predicted vehicle trajectory 220 and the third detected vehicle trajectory 226 may increase the magnitude of a driver profile deviation value of the third detected vehicle trajectory 226 and the driver profile.

Referring again to FIG. 7, a block 165 of the method 700 includes, in response to determining that the driver profile deviation value exceeds a profile deviation threshold, generating a response action. In embodiments, the driver profile deviation value may be determined to exceed a driver profile deviation threshold by either or both of the vehicle input monitor 313 of the vehicle computing device 310 and/or the remote vehicle input monitor 353 of the remote computing device 350. In embodiments, the response action may be generated by either or both of the vehicle input monitor 313 of the vehicle computing device 310 and/or the remote vehicle input monitor 353 of the remote computing device 350. In embodiments, one response action may be generated in the block 165. In embodiments, a plurality of response actions may be generated in the block 165. In embodiments, the response actions generated in block 165 may include any, some, or all of the response actions described above. In embodiments, after generating response actions in the block 165, the response actions may be implemented (e.g., via the vehicle control system 330 and/or the remote computing device 350) as described above with reference to the block 170.

It should now be understood that the present disclosure relates to various embodiments of methods, systems, and non-transitory computer-readable mediums for detecting and responding to the detection of a compromised vehicle, in particular for detecting compromised vehicles by monitoring inputs and/or detected trajectories of the compromised vehicles and implementing response actions to address the compromised vehicles.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for detecting and responding to the detection of a compromised vehicle, the method comprising:
   receiving, by a computing device, one or more monitored inputs of a vehicle;
   predicting, by the computing device and using at least one of the monitored inputs, a predicted vehicle trajectory, wherein the predicted vehicle trajectory includes speed;

detecting, by a vehicle sensing system, a detected vehicle trajectory, wherein the detected vehicle trajectory includes speed;

comparing, by the computing device, the predicted vehicle trajectory to the detected vehicle trajectory;

determining, by the computing device, a trajectory deviation value of the predicted vehicle trajectory and the detected vehicle trajectory;

in response to determining, by the computing device, that the trajectory deviation value exceeds a trajectory deviation threshold, identifying the vehicle as a compromised vehicle and generating a response action to account for a compromised nature of the compromised vehicle; and controlling the vehicle to perform the response action.

2. The method of claim 1, wherein the response action comprises physically disabling the compromised vehicle.

3. The method of claim 1, wherein the one or more monitored inputs are received from the vehicle sensing system, a driver of the vehicle, a remote computing device, an automated driving system of the vehicle, or a combination thereof.

4. The method of claim 1, wherein the one or more monitored inputs comprise at least one of a pedal throttle pattern input, a braking pattern input, a linear acceleration input, a lateral acceleration input, a turn smoothness input, a turn radius input, an operation mode input, an engine mode input, a gear mode input, a user-interfacing vehicle system input, or a combination thereof.

5. The method of claim 1, wherein the method further comprises:

comparing, by the computing device, at least one of the monitored inputs, the detected vehicle trajectory, or both to a driver profile;

determining, by the computing device, a driver profile deviation value of the driver profile and the detected vehicle trajectory, at least one of the monitored inputs, or both; and in response to determining, by the computing device, that the driver profile deviation value exceeds a profile deviation threshold, generating the response action.

6. The method of claim 5, wherein the driver profile is generated from historical inputs of a driver of the vehicle, an automated driving system of the vehicle, or a combination thereof.

7. The method of claim 1, wherein the response action comprises at least one of a security sweep, a shut-off of connectivity, an alert to a driver of the vehicle, an alert to a third party, a shut-off of the vehicle, a shut-off of a component of the vehicle, a shut-off of a system of the vehicle, an override instruction, an instruction check, or a combination thereof.

8. A system for detecting and responding to the detection of a compromised, the system comprising a vehicle sensing system of a vehicle and a computing device comprising a memory component, wherein the memory component stores logic that, when executed by the computing device, causes the system to perform at least the following:

receive one or more monitored inputs of the vehicle;

predict, using at least one of the monitored inputs, a predicted vehicle trajectory, wherein the predicted vehicle trajectory comprises speed;

detect, by the vehicle sensing system, a detected vehicle trajectory, wherein the detected vehicle trajectory comprises speed;

compare the predicted vehicle trajectory to the detected vehicle trajectory;

determine a trajectory deviation value of the predicted vehicle trajectory and the detected vehicle trajectory;

in response to determining that the trajectory deviation value exceeding a trajectory deviation threshold, identifying the vehicle as a compromised vehicle and generating a response action to account for a compromised nature of the compromised vehicle; and control the vehicle to perform the response action.

9. The system of claim 8, wherein the response action comprises physically disabling the compromised vehicle.

10. The system of claim 8, wherein the one or more monitored inputs are received from the vehicle sensing system, a driver of the vehicle, a remote computing device, an automated driving system of the vehicle, or a combination thereof.

11. The system of claim 8, wherein the one or more monitored inputs comprise at least one of a pedal throttle pattern input, a braking pattern input, a linear acceleration input, a lateral acceleration input, a turn smoothness input, a turn radius input, an operation mode input, an engine mode input, a gear mode input, a user-interfacing vehicle system input, or a combination thereof.

12. The system of claim 8, wherein the system further performs at least the following:

comparing the detected vehicle trajectory, at least one of the monitored inputs, or both to a driver profile;

determine a driver profile deviation value of the driver profile and the detected vehicle trajectory, at least one of the monitored inputs, or both; and generate, upon the driver profile deviation value exceeding a profile deviation threshold, the response action.

13. The system of claim 12, wherein the driver profile is generated from historical inputs of a driver of the vehicle, an automated driving system of the vehicle, or a combination thereof.

14. The system of claim 8, wherein the response action comprises at least one of a security sweep, a shut-off of connectivity, an alert to a driver of the vehicle, an alert to a third party, a shut-off of the vehicle, a shut-off of a component of the vehicle, a shut-off of a system of the vehicle, an override instruction, an instruction check, or a combination thereof.

15. A non-transitory computer-readable medium for detecting and responding to the detection of a compromised, wherein the non-transitory computer-readable medium stores logic that, when executed by a computing device, causes the computing device to perform at least the following:

receive one or more monitored inputs of a vehicle;

predict, using at least one of the monitored inputs, a predicted vehicle trajectory, wherein the predicted vehicle trajectory comprises speed;

detect, by a vehicle sensing system, a detected vehicle trajectory, wherein the detected vehicle trajectory comprises speed;

compare the predicted vehicle trajectory to the detected vehicle trajectory;

determine a trajectory deviation value of the predicted vehicle trajectory and the detected vehicle trajectory;

in response to determining that the trajectory deviation value exceeding a trajectory deviation threshold, identifying the vehicle as a compromised vehicle and generating a response action to account for a compromised nature of the compromised vehicle; and control the vehicle to perform the response action.

16. The computer-readable medium of claim 15, wherein the one or more monitored inputs are received from the vehicle sensing system, a driver of the vehicle, a remote computing device, an automated driving system of the vehicle, or a combination thereof.

17. The computer-readable medium of claim 15, wherein the one or more monitored inputs comprise at least one of a pedal throttle pattern input, a braking pattern input, a linear acceleration input, a lateral acceleration input, a turn smoothness input, a turn radius input, an operation mode input, an engine mode input, a gear mode input, a user-interfacing vehicle system input, or a combination thereof.

18. The computer-readable medium of claim 15, wherein the system further performs at least the following:
    comparing the detected vehicle trajectory, at least one of the monitored inputs, or both to a driver profile;
    determine a driver profile deviation value of the driver profile and the detected vehicle trajectory, at least one of the monitored inputs, or both; and
    in response to determining that the driver profile deviation value exceeds a profile deviation threshold, generating the response action.

19. The computer-readable medium of claim 18, wherein the driver profile is generated from historical inputs of a driver of the vehicle, an automated driving system of the vehicle, or a combination thereof.

20. The computer-readable medium of claim 15, wherein the response action comprises at least one of a security sweep of the vehicle, a shut-off of connectivity of the vehicle, an alert to a driver of the vehicle, an alert to a third party, a shut-off of the vehicle, a shut-off of a component of the vehicle, a shut-off of a system of the vehicle, an override instruction, an instruction check, or a combination thereof.

* * * * *